Figure 1:
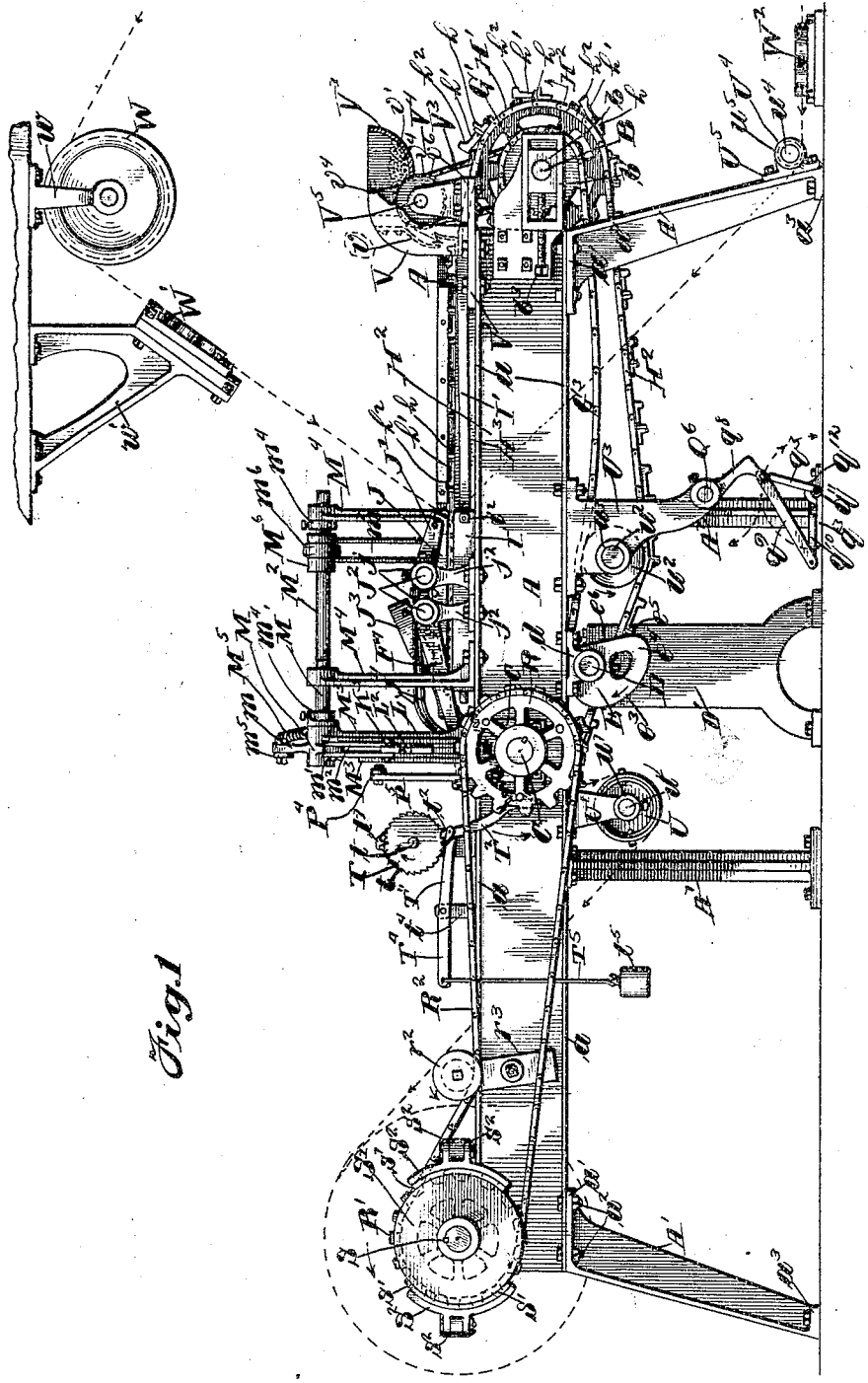

No. 773,491. PATENTED OCT. 25, 1904.
J. E. FREDRICK.
MACHINE FOR MAKING ORNAMENTAL FENCE.
APPLICATION FILED OCT. 10, 1902. RENEWED JULY 18, 1904.
NO MODEL. 13 SHEETS—SHEET 1.

Witnesses:
Inventor:
John E. Fredrick

No. 773,491. PATENTED OCT. 25, 1904.
J. E. FREDRICK.
MACHINE FOR MAKING ORNAMENTAL FENCE.
APPLICATION FILED OCT. 10, 1902. RENEWED JULY 18, 1904.
NO MODEL. 13 SHEETS—SHEET 2.
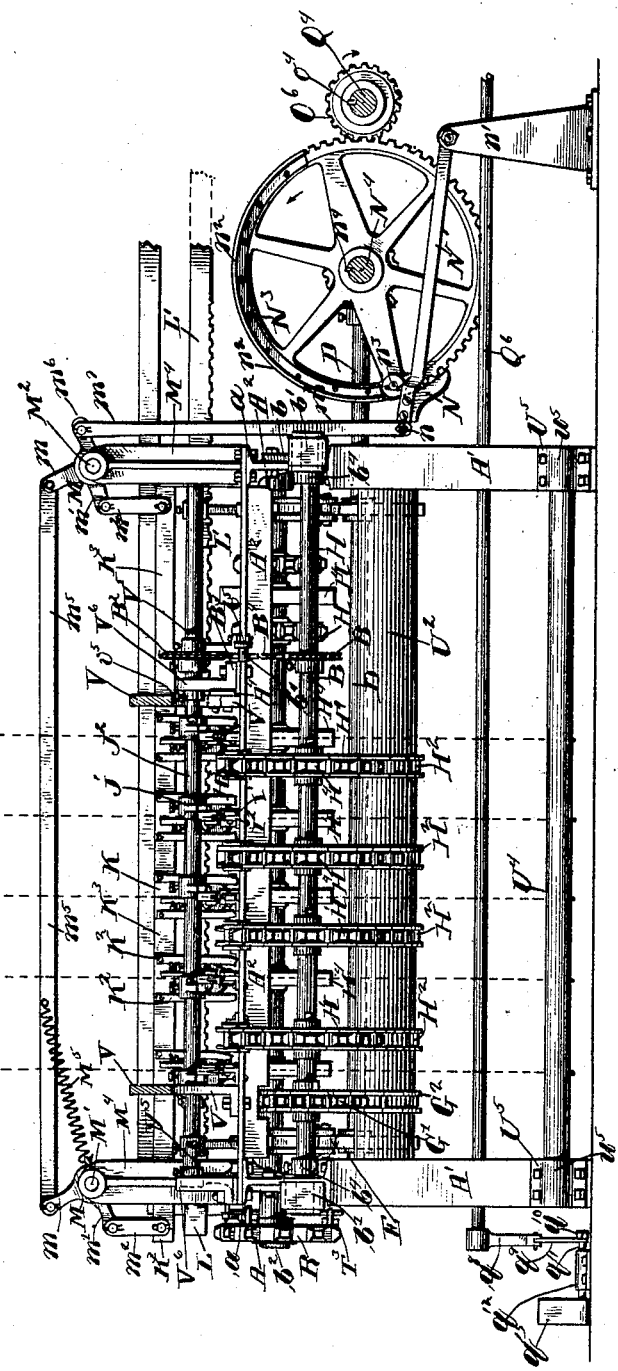

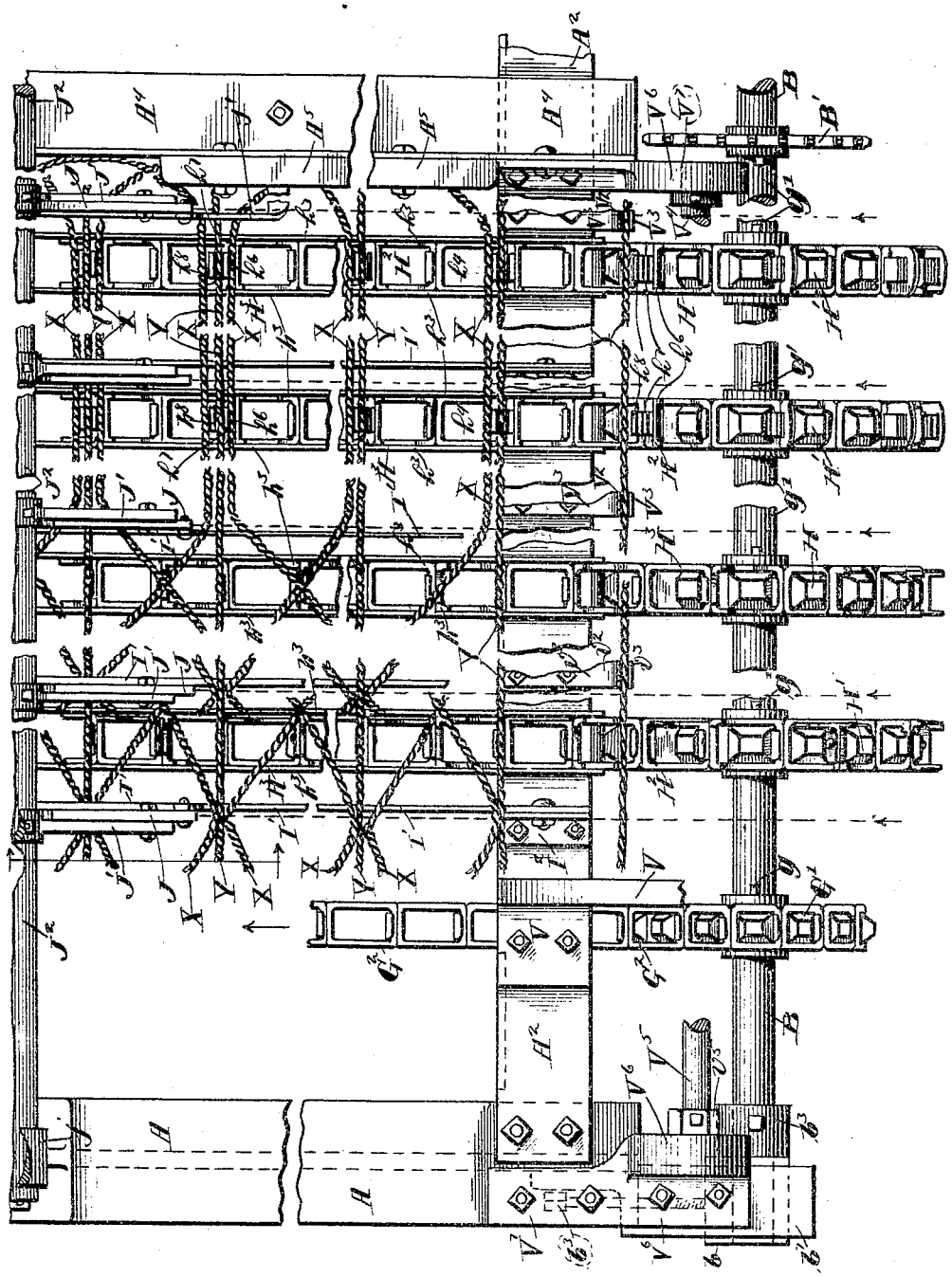

No. 773,491. PATENTED OCT. 25, 1904.
J. E. FREDRICK.
MACHINE FOR MAKING ORNAMENTAL FENCE.
APPLICATION FILED OCT. 10, 1902. RENEWED JULY 18, 1904.
NO MODEL. 13 SHEETS—SHEET 4.
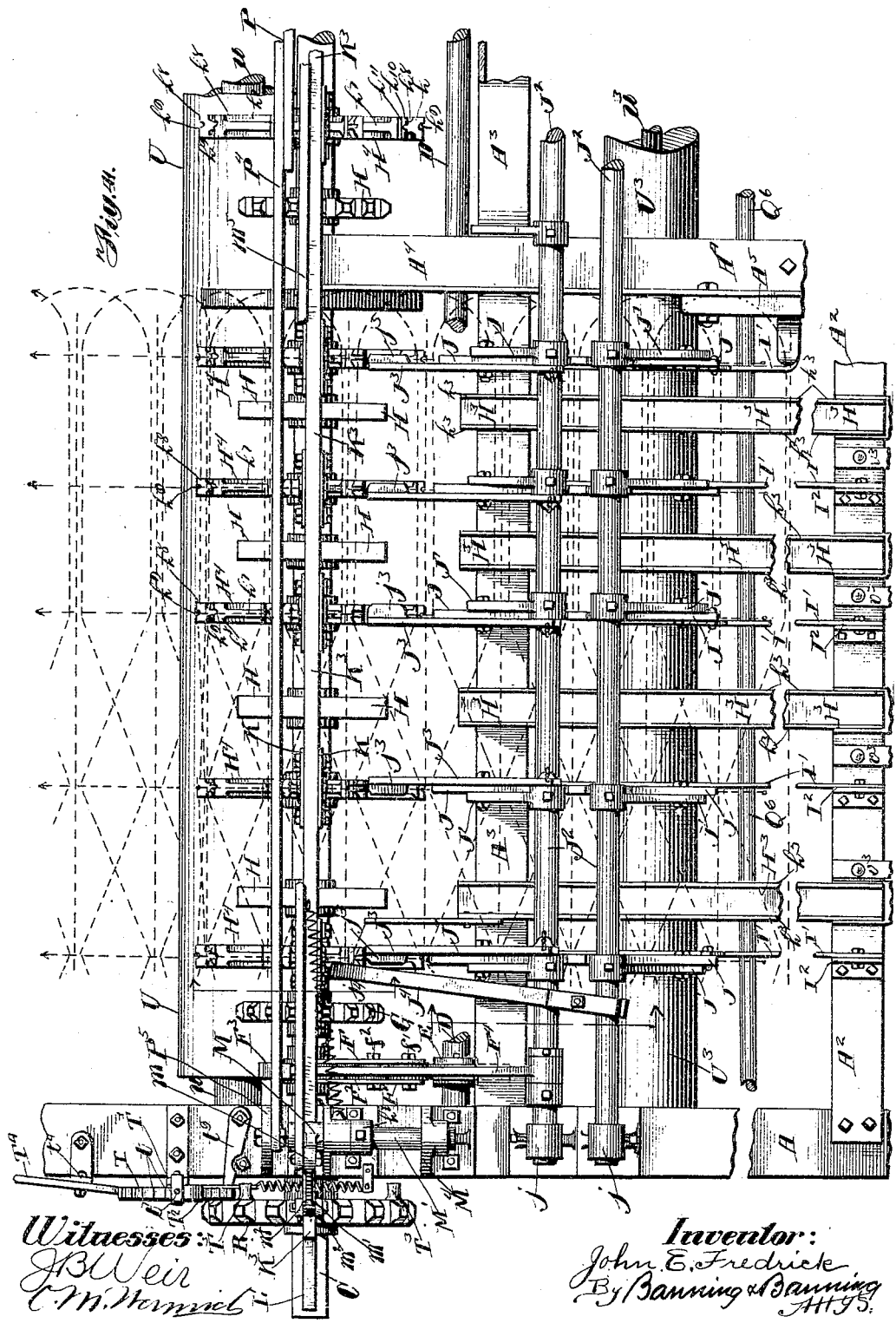

No. 773,491. PATENTED OCT. 25, 1904.
J. E. FREDRICK.
MACHINE FOR MAKING ORNAMENTAL FENCE.
APPLICATION FILED OCT. 10, 1902. RENEWED JULY 18, 1904.
NO MODEL. 13 SHEETS—SHEET 5.
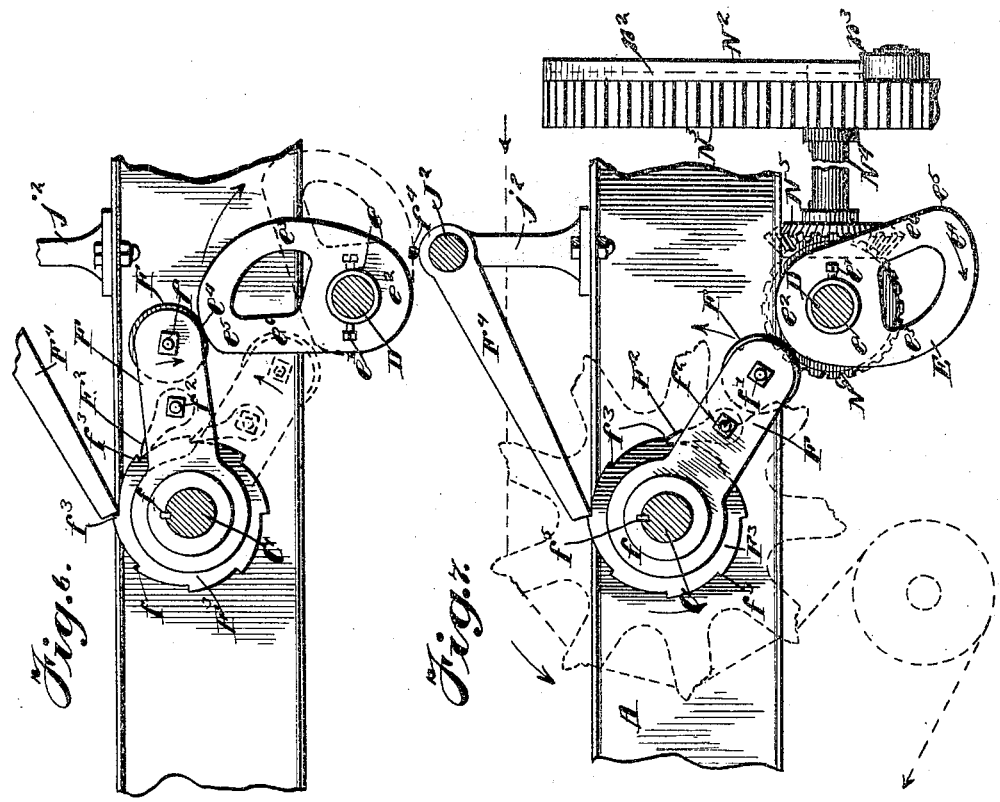
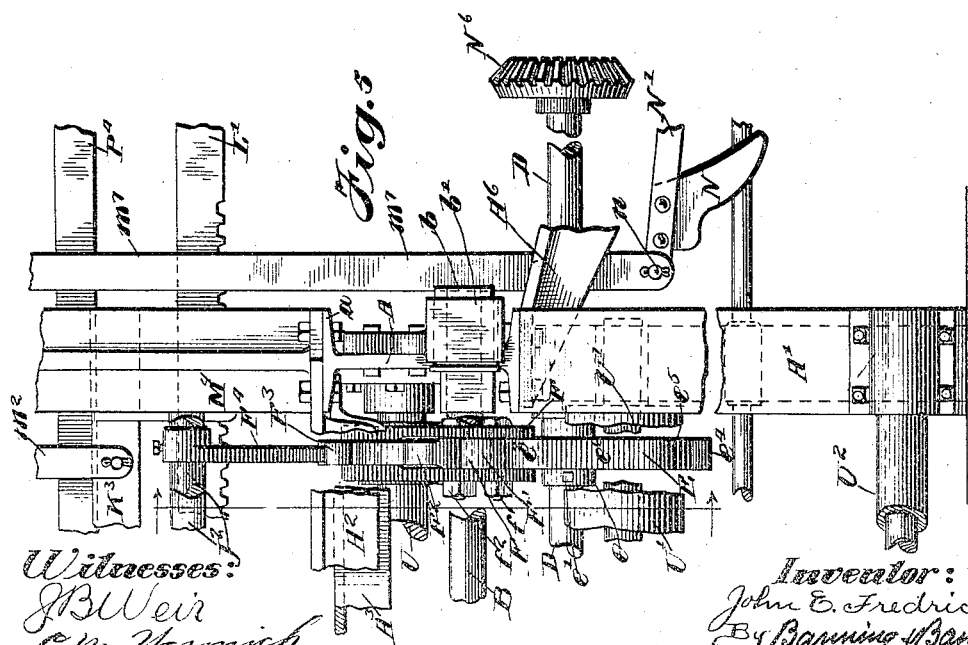
Witnesses:
Inventor:
John E. Fredrick
By Banning & Banning
Attys.

No. 773,491. PATENTED OCT. 25, 1904.
J. E. FREDRICK.
MACHINE FOR MAKING ORNAMENTAL FENCE.
APPLICATION FILED OCT. 10, 1902. RENEWED JULY 18, 1904.
NO MODEL. 13 SHEETS—SHEET 6.
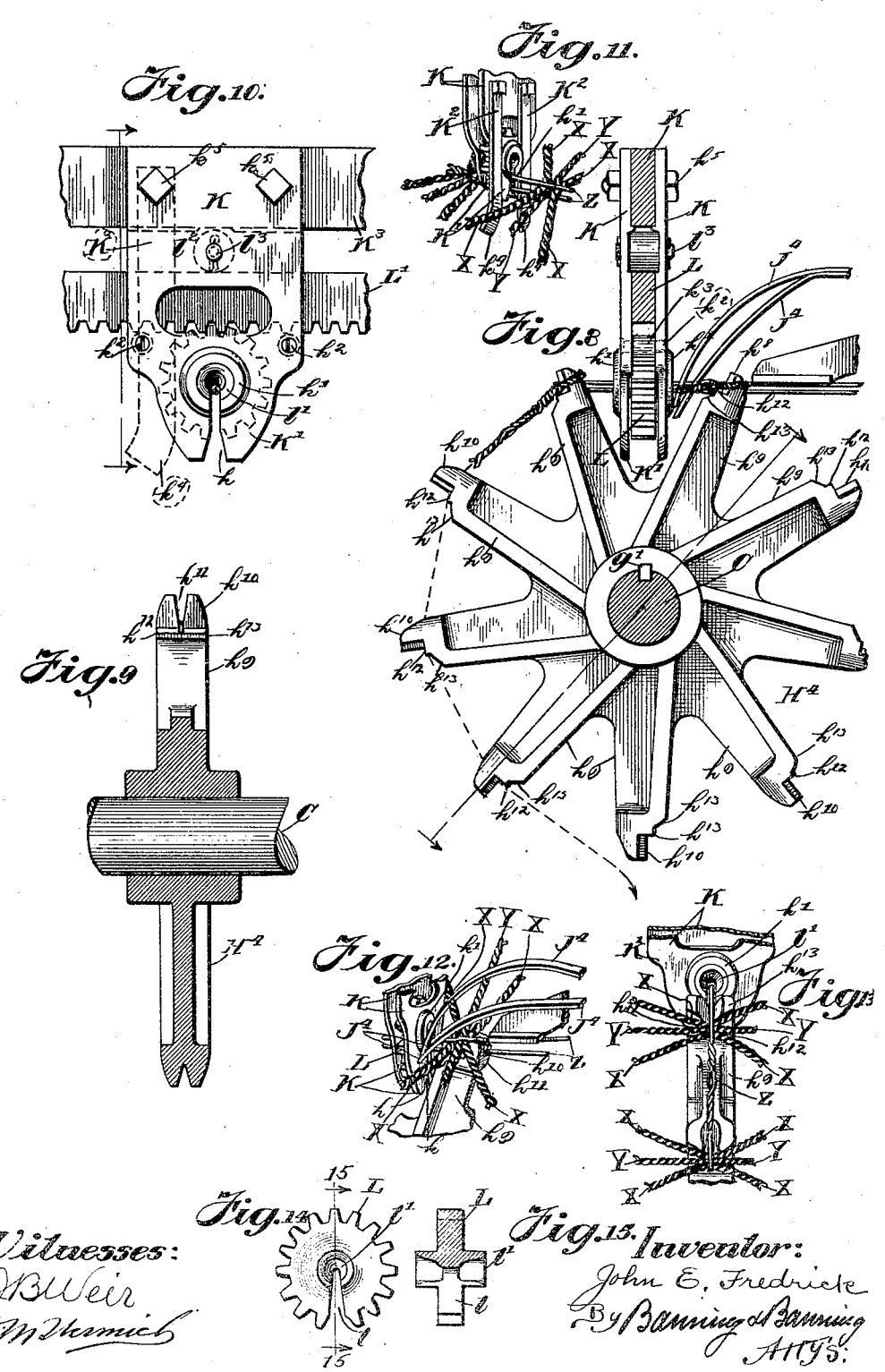

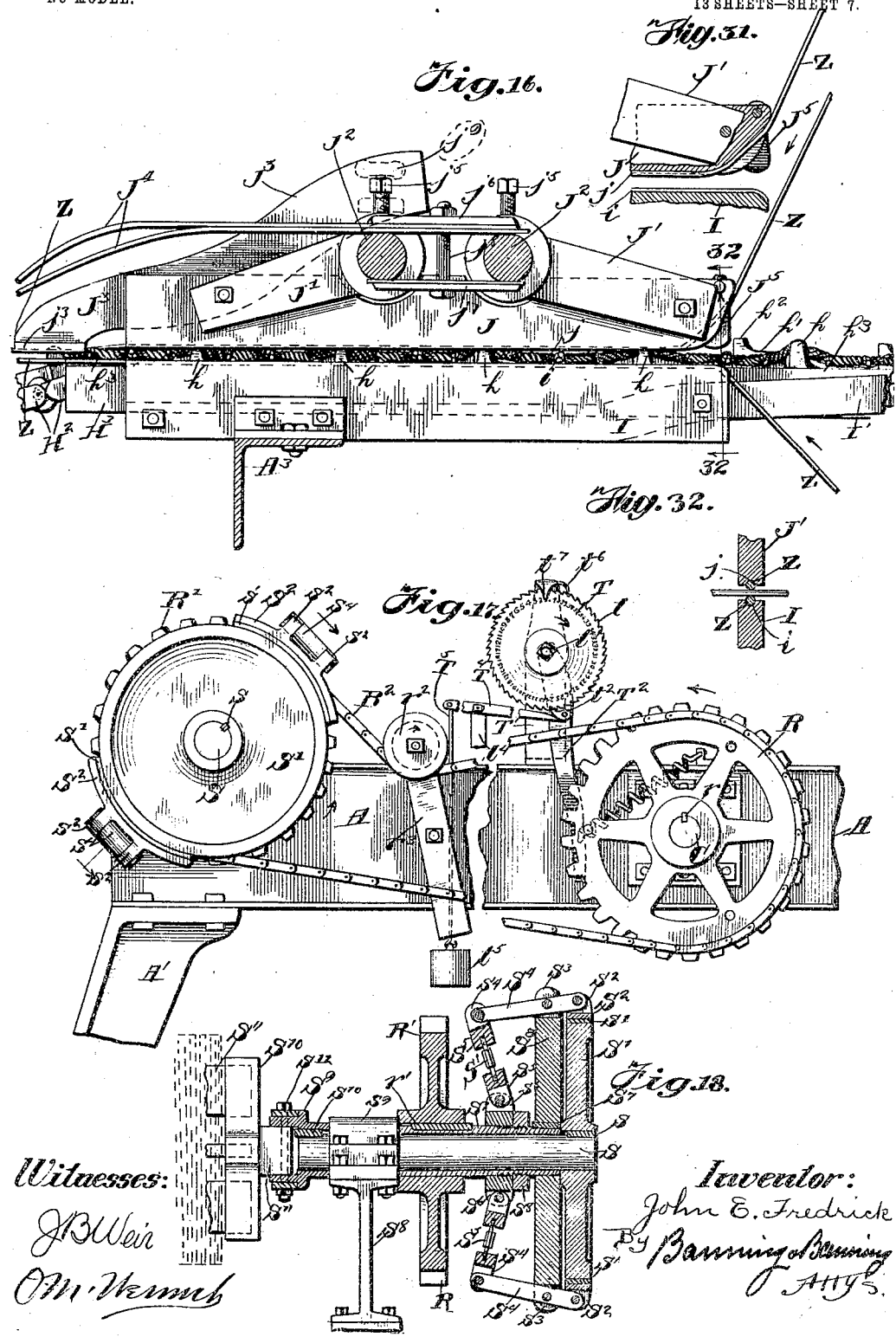

No. 773,491. PATENTED OCT. 25, 1904.
J. E. FREDRICK.
MACHINE FOR MAKING ORNAMENTAL FENCE.
APPLICATION FILED OCT. 10, 1902. RENEWED JULY 18, 1904.
NO MODEL. 13 SHEETS—SHEET 8.

Witnesses:
J. B. Weir
O. M. Nunnich

Inventor:
John E. Fredrick
By Banning & Banning
Attys.

No. 773,491. PATENTED OCT. 25, 1904.
J. E. FREDRICK.
MACHINE FOR MAKING ORNAMENTAL FENCE.
APPLICATION FILED OCT. 10, 1902. RENEWED JULY 18, 1904.
NO MODEL. 13 SHEETS—SHEET 9.

Witnesses:
Inventor:
John E. Fredrick
By Banning & Banning
Attys.

No. 773,491. PATENTED OCT. 25, 1904.
J. E. FREDRICK.
MACHINE FOR MAKING ORNAMENTAL FENCE.
APPLICATION FILED OCT. 10, 1902. RENEWED JULY 18, 1904.
NO MODEL. 13 SHEETS—SHEET 10.
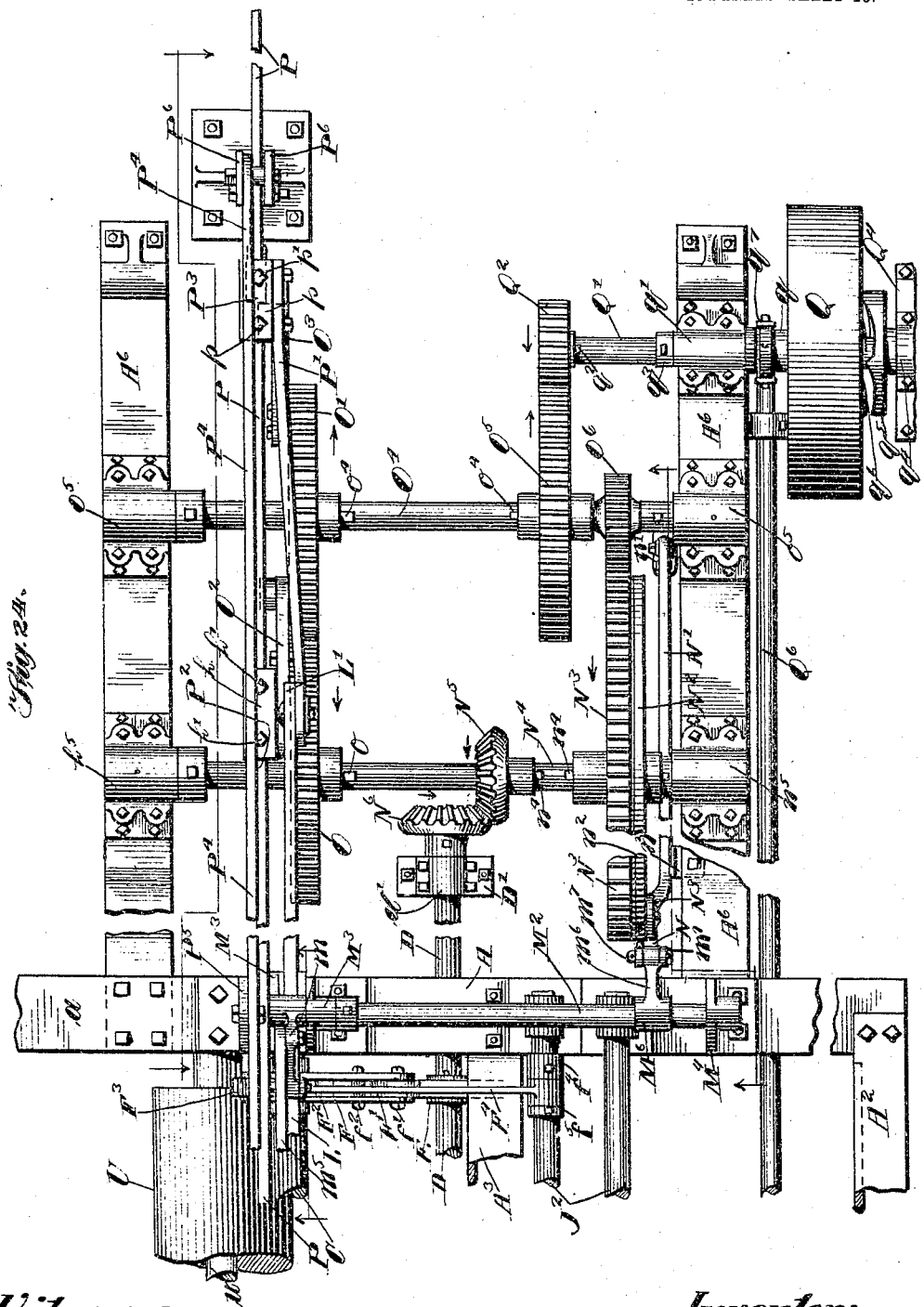
Witnesses:
JB Weir
CM Wernick
Inventor:
John E. Fredrick
By Banning & Banning
Att'ys.

No. 773,491. PATENTED OCT. 25, 1904.
J. E. FREDRICK.
MACHINE FOR MAKING ORNAMENTAL FENCE.
APPLICATION FILED OCT. 10, 1902. RENEWED JULY 18, 1904.
NO MODEL. 13 SHEETS—SHEET 11.
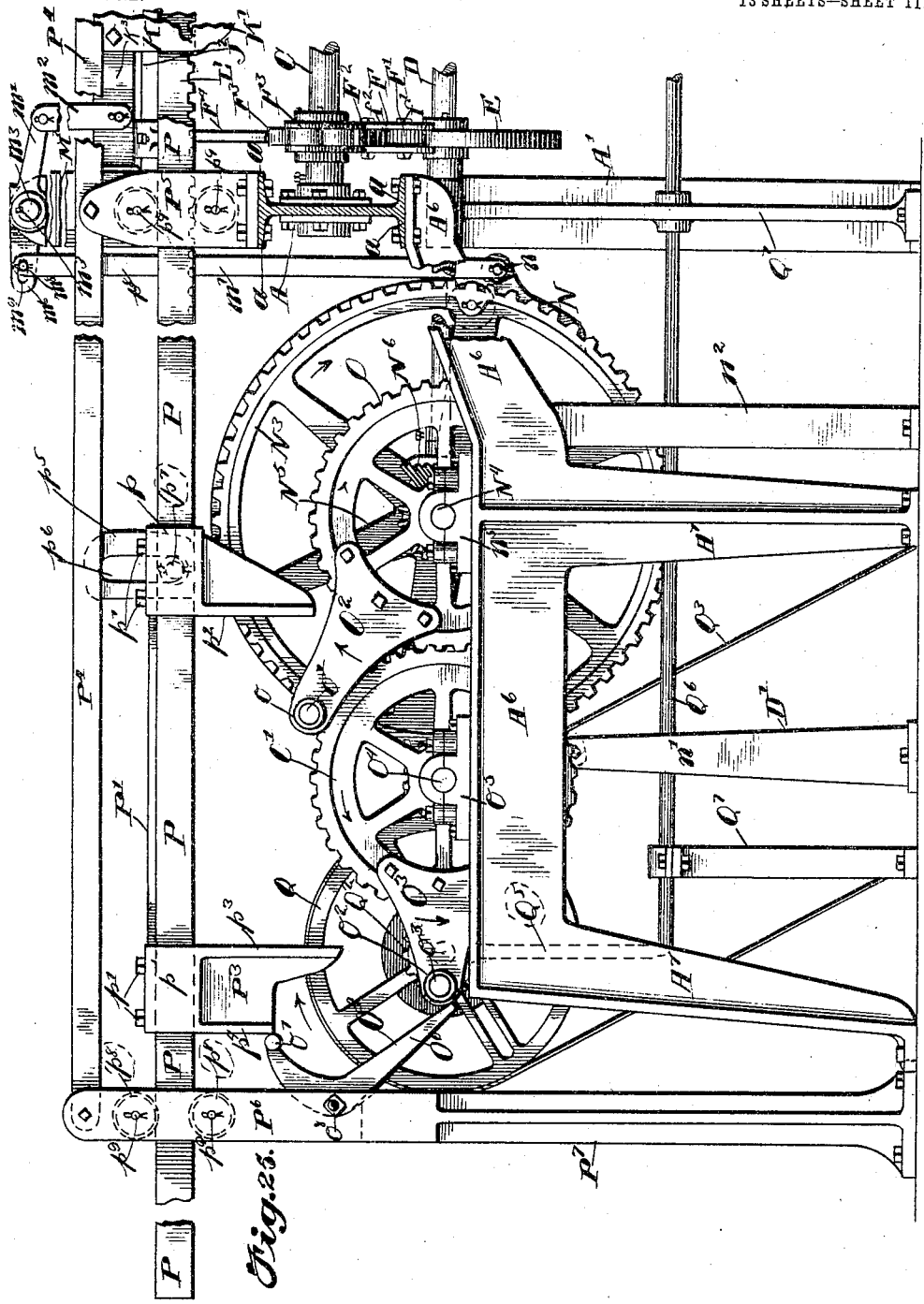
Witnesses:
Inventor:
John E. Fredrick
By Banning & Banning
Att'ys.

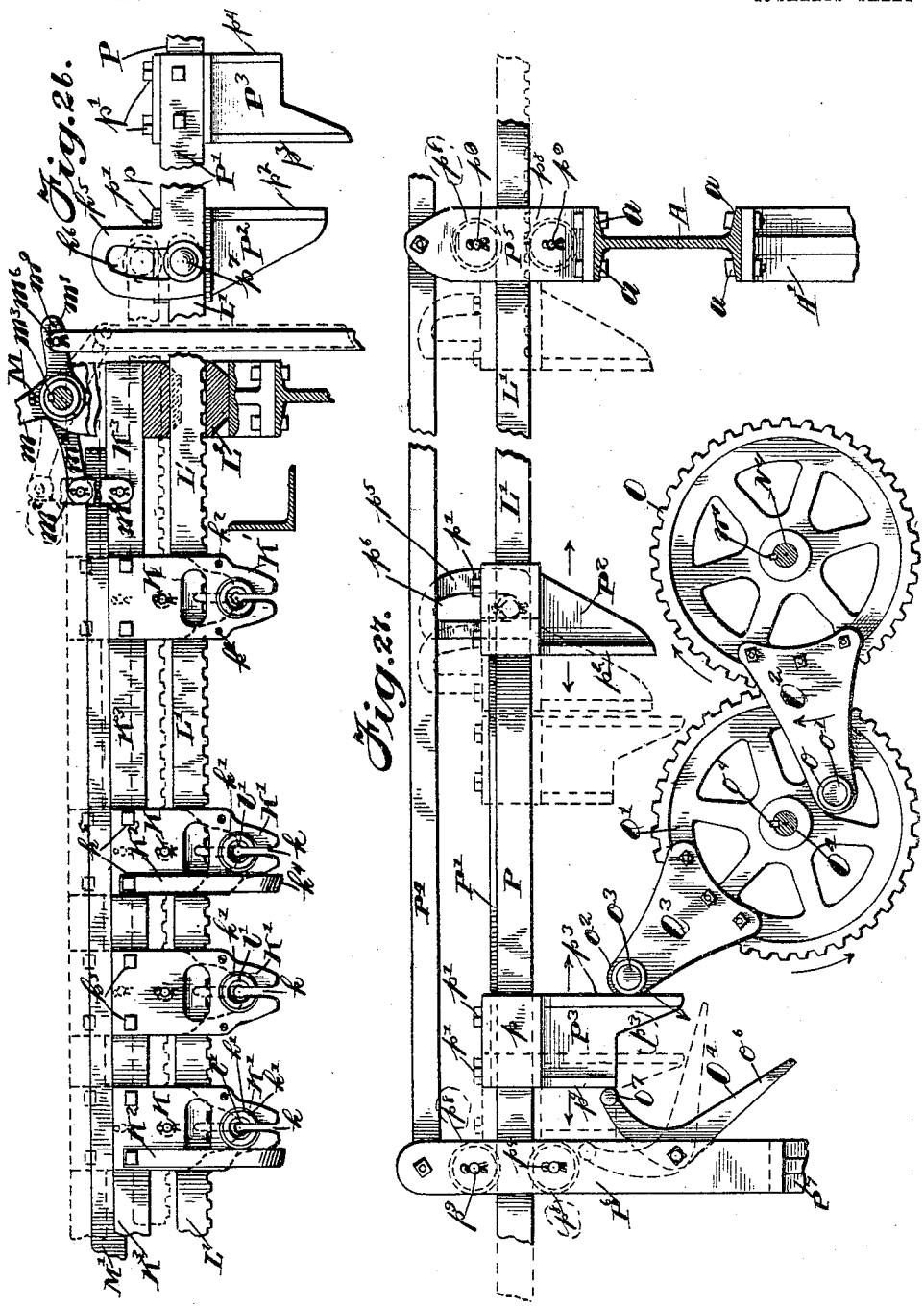

No. 773,491. PATENTED OCT. 25, 1904.
J. E. FREDRICK.
MACHINE FOR MAKING ORNAMENTAL FENCE.
APPLICATION FILED OCT. 10, 1902. RENEWED JULY 18, 1904.
NO MODEL. 13 SHEETS—SHEET 13.
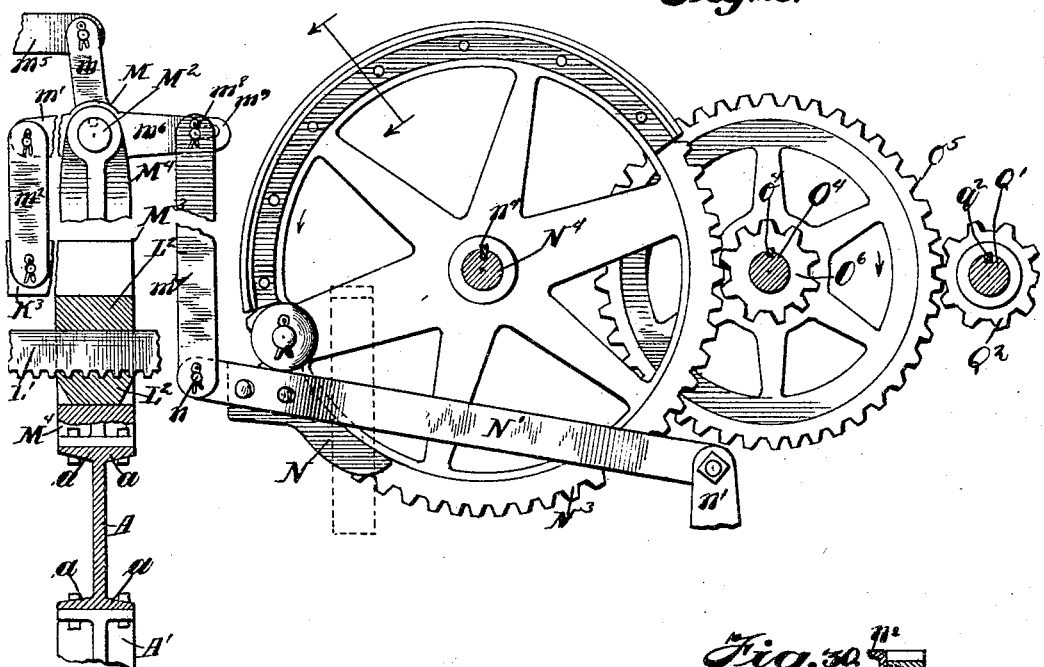
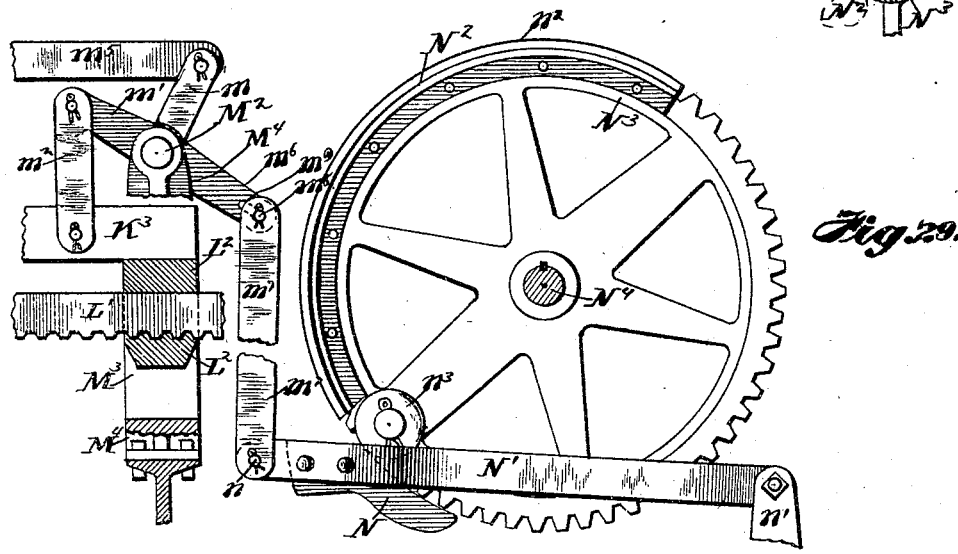
Witnesses: Inventor:
John E. Fredrick
By Banning & Banning
Attys.

No. 773,491. Patented October 25, 1904.

UNITED STATES PATENT OFFICE.

JOHN E. FREDRICK, OF KOKOMO, INDIANA, ASSIGNOR TO KOKOMO STEEL & WIRE COMPANY, OF KOKOMO, INDIANA, A CORPORATION OF INDIANA.

MACHINE FOR MAKING ORNAMENTAL FENCE.

SPECIFICATION forming part of Letters Patent No. 773,491, dated October 25, 1904.

Application filed October 10, 1902. Renewed July 18, 1904. Serial No. 217,134. (No model.)

*To all whom it may concern:*

Be it known that I, JOHN E. FREDRICK, a citizen of the United States, residing at Kokomo, in the county of Howard and State of Indiana, have invented certain new and useful Improvements in Machines for Making Ornamental Fence, of which the following is a specification.

The object of this invention is to construct a machine by which the straight pickets and bow pickets of an ornamental fence when placed in position on the strand or longitudinal tie-wires will be automatically fed forward and secured in place by twisting the strand or longitudinal tie-wires between the bow pickets, so as to form a loop around the straight picket and the sides of two adjoining bow pickets, by which both pickets will be held firmly and securely in place; and further objects are to enable the straight and bow pickets to be moved or fed forward automatically into position for the operation of the twisting mechanism for the strand or longitudinal tie-wires, to automatically raise and lower the twisting mechanism for the strand or longitudinal tie-wires and have the twisting mechanism returned to normal position when raised and to operate when lowered and twist the strand or longitudinal tie-wires, to furnish a driving mechanism for operating the feeding devices for the pickets, to control the reeling operation coincident with the operation of the feed mechanism, to lay the pickets in position and deliver the same between the strand or longitudinal tie-wires for the action of the twisting mechanism, to give the feed mechanism an intermittent advance at the time that the twisting mechanism is raised and out of use and have the feed mechanism at rest during the twisting operation when the twisting mechanism is dropped, and to improve generally the construction and operation of the machine as a whole.

The invention consists in the features of construction and combinations of parts hereinafter described and claimed.

Figures 19, 20:
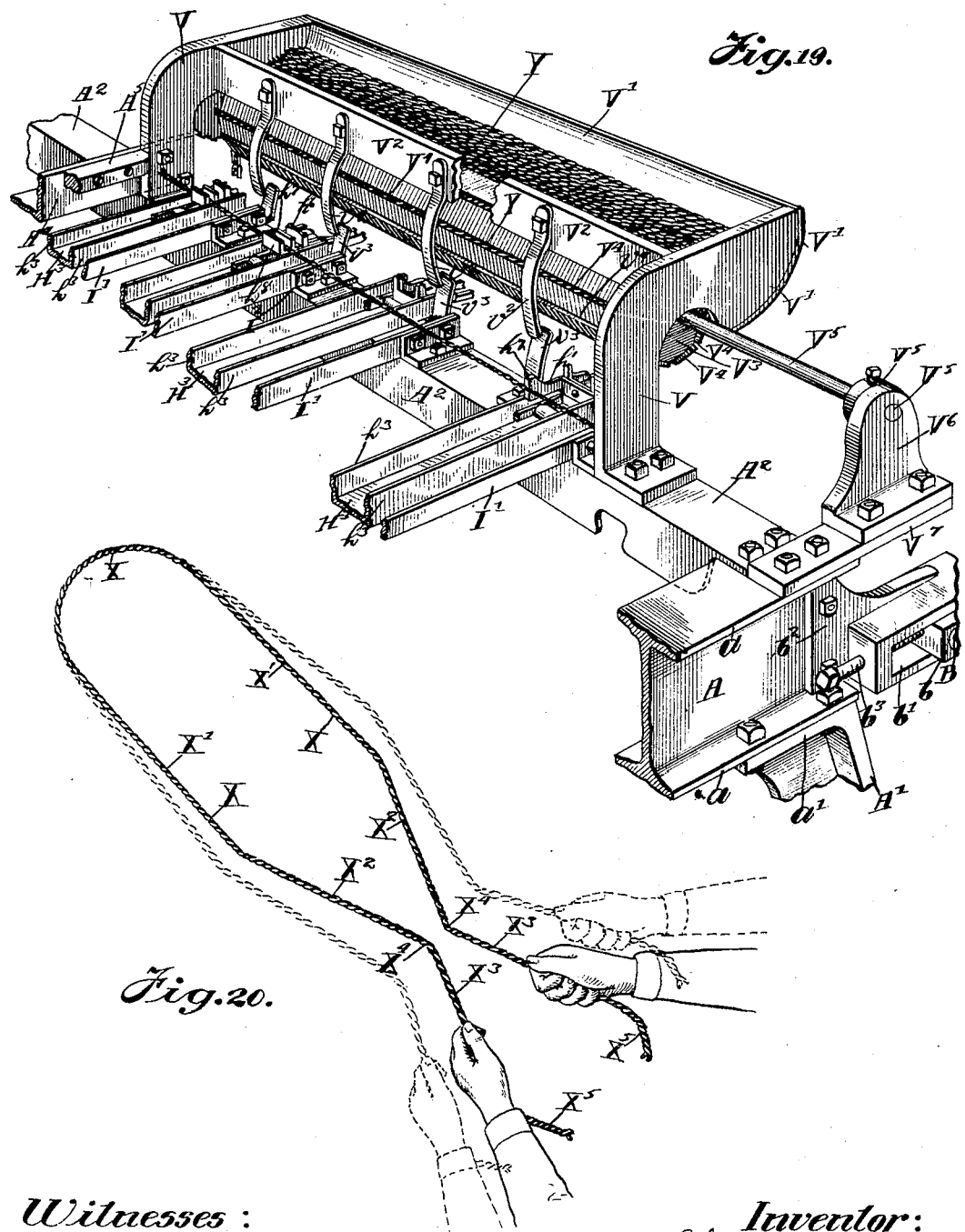
Figure 21:
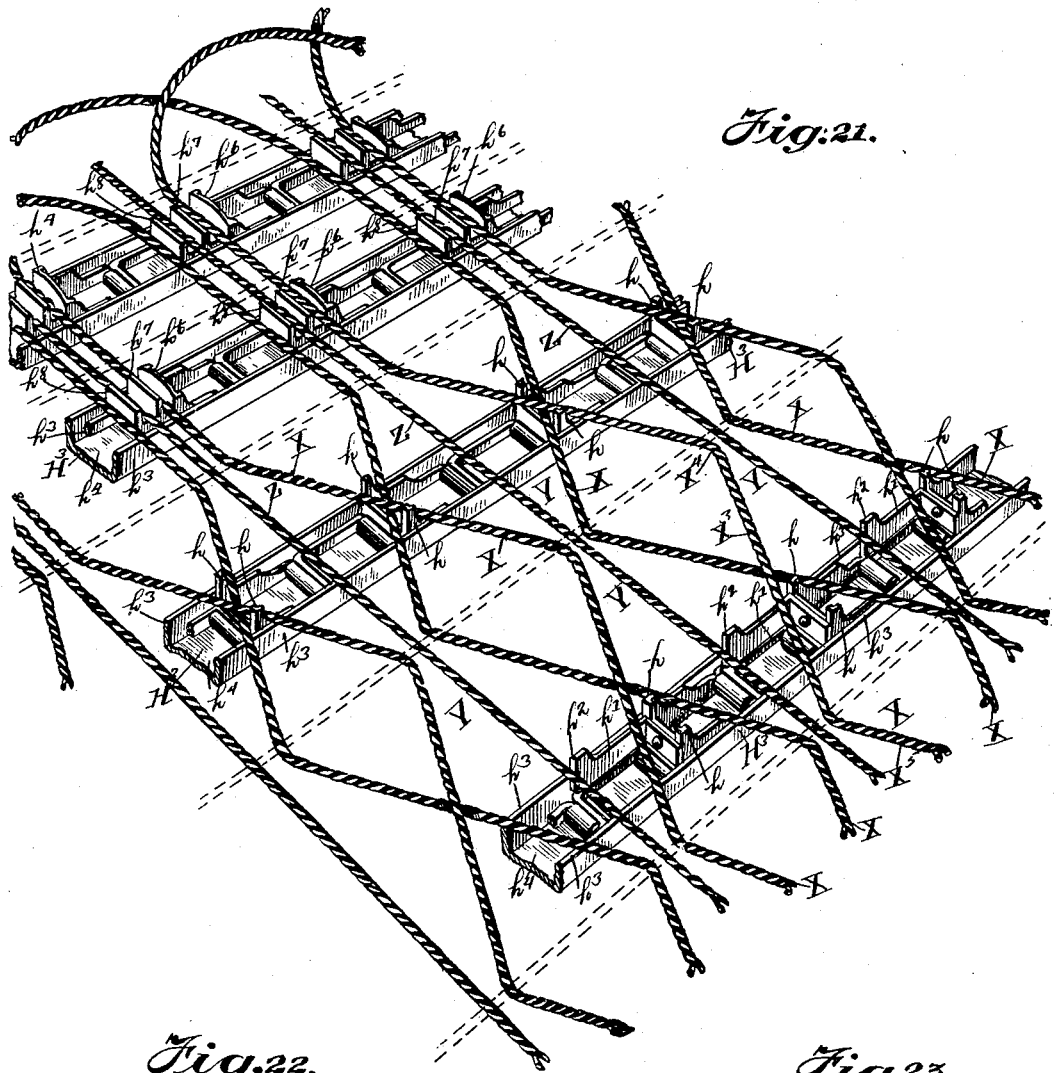
Figure 22:
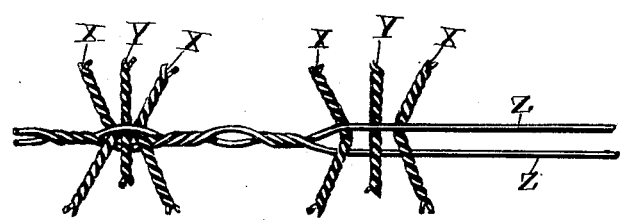
Figure 23:
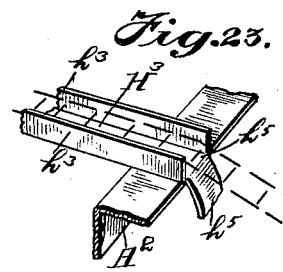

In the drawings, Figure 1 is a side elevation of the machine, showing the guides for the upper and lower strand or longitudinal tie-wires; Fig. 2, an end elevation of the machine, showing a portion of the driving-gear mechanism; Fig. 3, a top or plan view showing one end of the machine with the feed-chains for the pickets and the cross-bars and driving-shafts broken out; Fig. 4, a top or plan view showing the troughs or guides for the feed-chains broken out and showing the twisting mechanism and the carrying-wheels for the advance after the strand or longitudinal tie-wires have been twisted to hold the pickets in place; Fig. 5, a detail, being an end elevation, showing the mechanism for intermittently operating the feed-chains and showing also a portion of the rack for operating the twisting mechanism; Fig. 6, a detail, partly in section, showing the cam and the pawl-arm and ratchet-wheel for the intermittent feed of the carrying-chains; Fig. 7, a similar view to Fig. 6, showing the cam and the pawl-arm down, Fig. 6 showing these parts raised; Fig. 8, a detail showing a side elevation of the carrying-wheel for the completed fence and showing, partly in section, the twisting mechanism for the strand or longitudinal tie-wires; Fig. 9, a detail in section of the carrying-wheel for the completed fence; Fig. 10, a detail, being an elevation of one of the twisting-heads and twisting-pinions and showing also a portion of the rack for operating the twisting-pinions; Fig. 11, a detail in perspective of the lower end of a twisting-head with the twisting-pinion and showing on opposite sides of the head and pinion the arrangement of the pickets before and after a twisting operation; Fig. 12, a detail in perspective showing the lower end of a twisting-head with its twisting-pinion and showing one arm or spoke of the carrying-wheel and the end of a retainer or catch arm for bringing the free ends of the pickets together and preventing the advance free end of the bow picket from springing out of place; Fig. 13, a detail in elevation showing the lower end of a twisting-head and a section of two arms or spokes of the carrying-wheel on the delivery side of the twisting-head; Fig. 14, a face view of the twisting-pinion; Fig. 15, a sectional elevation of the twisting-pinion shown in Fig. 14; Fig. 16, a detail showing a trough or guideway for the picket-carrying chains and the guides for the upper and lower strand or longitudinal tie-wires with the supporting-rods for the upper guide and the cross-plate for the lower guide in section and showing also the presser-arm and the retainer-arm at the delivery end of the guides for the strand or longitudinal tie-wires; Fig. 17, a detail, being a side elevation of the reel-operating mechanism and showing also the registering mechanism for the amount of fence produced on the machine; Fig. 18, a detail, partly in section, of the brake for controlling the reel as the fence winds thereon; Fig. 19, a perspective view showing the trough from which the straight pickets are fed and the feeding-roller and guide-fingers for depositing a single picket onto the picket-carrying or feed chains; Fig. 20, a view showing the manner of holding the bow pickets for placing the pickets in position on the carrying-chains; Fig. 21, a detail in perspective showing the manner of placing the straight pickets and the bow pickets on the carrying-chains; Fig. 22, a detail showing the condition of the pickets with the strand or longitudinal tie-wires fully twisted and showing also the condition of the pickets before the final twist is made for holding the pickets in position; Fig. 23, a detail in perspective showing the receiving end of a trough or guideway for the feed or carrying chains; Fig. 24, a top or plan view of the gear driving mechanism of the machine, showing also one side of a portion of the fence-forming mechanism; Fig. 25, a side elevation of the driving gear or mechanism of the machine, showing also the devices for reciprocating the rack-bar which actuates the twisting-pinions; Fig. 26, a detail, being an elevation showing in full lines the twisting-heads and the rack-bar in their lowered position for twisting and showing in dotted lines the same parts in their raised or elevated position and out of use; Fig. 27, a detail in side elevation of the gear and the stops or heads for reciprocating the rack-bar; Fig. 28, a detail in elevation of the track-gear for raising and lowering the rack-bar and showing a portion of the raising and lowering devices for the rack-bar; Fig. 29, a similar view to Fig. 28, showing the rack-bar raised, Fig. 28 showing the rack-bar lowered; Fig. 30, a detail in section of the track-gear; Fig. 31, a detail, partly in section, showing the upper and lower guides for the strand or longitudinal wires; and Fig. 32, a detail in section of the upper and lower guides for the strand or longitudinal wires.

The machine is constructed with a main frame consisting, as shown, of side beams A, each side beam having at each end a leg A', and at one end of the side beams is a cross iron or plate $A^2$, with another cross iron or plate, $A^3$, in advance of the end cross iron or plate. The side beams, as shown, are of the I-beam type, but could be of other formation, and, as shown, the legs or supports A' are attached to the side beams by bolts $a^2$ passing through a flange $a'$ on the upper end of the leg or support and the lower flange $a$ of the beam, and each leg has a foot or angle piece $a^3$, through which bolts pass for attaching the machine to a floor or other support.

At the receiving end of the machine is a cross-shaft B, mounted in journal-boxes $b$ at each end, each journal-box slidable in a guideway $b'$ on a bracket-plate $b^2$, bolted or otherwise fastened to the web of the side beam in the construction shown, and each journal-box is adjusted or moved in its guideway by an adjusting-screw $b^3$, the stem of which passes through the end of the guideway for its end to bear against the end face of the journal-box, as shown in Fig. 1. A companion shaft C is mounted in suitable bearings or journal-boxes $c$ on the side beams A, forward of the shaft B in the arrangement shown. A shaft D is mounted in suitable bearings or journal-boxes $d$, attached to the under side of each side beam, and at one end this shaft D extends beyond the side beam and is mounted in a suitable journal-bearing or journal-box $d'$ on a post or standard D', and this shaft D is the main driving-shaft of the machine.

The shaft D, adjacent to the inside of each side beam A, has fixed thereto a cam E, as shown in Figs. 1, 2, 4, 5, 6, 7, 24, and 25. Each cam E has a hub or annular rim $e$, through which a set-screw $e'$ passes for enabling the cam to be properly adjusted and locked on the main shaft D, and each cam has a circular face $e^2$, a curved face $e^3$ with an apex or projected curvature $e^4$, continuing with a curve until it joins a straight face $e^6$ at a point $e^5$, which gives the highest point of projection or lift for the cam at a point forward of the juncture with the straight face. The shaft C, adjacent to the inside of each side beam and in line with each cam E, has an arm F mounted on the hub $f$ of a ratchet-wheel $F^3$, which hub is secured to the shaft by a key $f^5$ or otherwise, and each arm at its outer or free end has a roller F', carried by a pin or journal $f'$, which roller is engaged by the acting or peripheral face of the cam for the rotation of the cam to raise the outer or free end of the arm. Each arm carries a dog or pawl $F^2$, pivotally attached to the arm by a pin or pivot $f^2$ and having its acting or free end arranged to engage with the teeth $f^3$ of the ratchet wheel or disk $F^3$ for the upward movement of the arm through the rotation of the cam to advance the ratchet wheel or disk the distance of a notch and by reason of the fixed attachment of the ratchet wheel or disk to the shaft giving the shaft C a partial rotation equal to the distance of the advance of the ratchet wheel or disk. A pawl or stop-arm F⁴ is arranged for its outer or free end to engage the ratchet-teeth $f^3$ of the ratchet wheel or disk, and the outer or free end of the pawl or stop-arm F⁴ is located back of the point where the ratchet-teeth are successively left with the forward throw of the arm, which allows of a back movement of the ratchet wheel or disk and the shaft, which back movement or lash is necessary to permit of the strand or longitudinal tie-wires being twisted, as hereinafter described, without producing an excessive strain on the wires and the operating parts of the machine.

The shaft C has fixed thereon adjacent to and inside of the ratchet wheel or disk a sprocket-wheel G, and the shaft B has fixed thereon in line with the sprocket-wheel G a sprocket-wheel G', over which sprocket-wheels G and G' a sprocket-chain runs for intermittently turning the shaft B with the turning of the shaft C from the action of the ratchet wheel or disk and its operating pawl or dog, giving a simultaneous partial rotation to both shafts. The shaft C has fixed thereon a series of sprocket-wheels H, and the shaft B has fixed thereon in line with the sprocket-wheels H a series of sprocket-wheels H', and over these sprocket-wheels H and H' sprocket-chains H² run. Each sprocket-chain runs in a trough or guideway H³, attached to the cross plates or bars A² and A³ and terminating forward a little in advance of the cross bar or plate A³ and starting from the cross bar or plate A², as shown in Figs. 3 and 4. Each trough or guideway H³ has side flanges $h^3$ and a bottom $h^4$, between and over which the chain travels, and in order to facilitate the passage of the chain from the sprocket-wheels H' onto the trough or guideway the receiving end of each guideway has its bottom turned downwardly on a curve to form a guide end $h^5$, over which the links of the chain pass from the sprocket-wheel. The carrying-chains H² are similar in construction. One chain has each alternating link provided with stops or studs $h$, and attached to each link having the studs is a plate $h'$, having a stop or stud $h^2$, the plate extending the length of the side bar of the preceding link and the stud terminating near the end of the side bar, as shown in Fig. 21 more particularly. The chain H², adjacent to the first chain just described, has each alternating link provided with stops or studs $h$, but does not have the plate $h'$ with the stud $h^2$, as shown in Fig. 21. Each of the two remaining chains in Fig. 21 has each alternating link provided with a head or support consisting of plates $h^6$, $h^7$, and $h^8$, so as to form two spaces, one between the plates $h^6$ and $h^7$ and the other between the plates $h^7$ and $h^8$, and the space between the plates $h^7$ and $h^8$ receives the straight pickets, while the space between the plates $h^6$ and $h^7$ receives the straight portion of one side of the bow picket, the other side of the straight portion of a bow picket abutting against the plate $h^8$, as shown in Fig. 21, and when in place the diagonal portion of two bow pickets cross between the stops or studs $h$ of the second chain, and the remaining diagonal portion of the bow picket comes back of a stop or stud $h$ on the first chain, with the straight picket forward of the stud $h^2$, as shown in the arrangement of pickets in Fig. 21. It will be thus seen that the straight pickets and the bow pickets are supported and held in place on the carrying-chains by the stops and the studs and the walls or plates and that a straight picket is interposed between each bow picket, with the result that the advance of the carrying or feed chains through the intermittent rotation of the shafts B and C will carry forward the pickets.

A lower guide I and a companion upper guide J are provided for each strand or longitudinal tie-wire, which guides, as shown, are arranged between the troughs or guideways for the carrying-chains of the pickets and are located to bring the strand or longitudinal tie-wires in proper position in relation to the straight and diagonal or diamond portions of the bow pickets, as shown in Fig. 4. Each guide I has in its inner face a groove $i$ for holding the lower strand or longitudinal tie-wire in place, and each upper guide J has in its inner face a groove $j$ for holding the upper strand or longitudinal tie-wire in place, with the two guides set at the required distance apart for the passage between them of the pickets and to have the pickets between the upper and lower strand or longitudinal tie-wires. Each lower guide I is attached at its forward end to the angle iron beam or plate A³ and is supported by a bar I', to which the guide is bolted, which bar is attached at its rear end to the angle iron or plate A² by angle bracket-plates I², bolted or otherwise fastened to the plate or bar A² and to the bar I', as shown in Fig. 3. Each upper guide-plate J is suspended by arms J', extending in opposite directions from supporting-rods J², which rods are mounted in boxes $j'$ on standards $j^2$, bolted or otherwise secured to the upper flange $a$ of each side beam of the main frame, and each arm J' is attached by a single bolt or otherwise to the upper guide and has a hub or band through which a set-screw $j^5$ passes for engaging the rod J² and enabling the upper guide to be raised or lowered, as required, for adjusting the space between the two guides for the passage of the strand or tie wires and the pickets. Mounted on one of the rods J², adjacent to each guide for the strand or longitudinal tie-wires, is an arm J³, having at its outer or free end a lateral extending flange or foot $j^3$, which projects or extends over the wires and pickets after they leave the upper and lower guides and holds the pickets down between the ends of the troughs or guideways H³ and the twisting mechanism, and each arm J³ at its mounted end has an adjusting screw or stem, by means of which its outer or free end can be raised or lowered for the foot or lateral flange thereof to be in proper correlation with the wires and pickets.

At one side of the machine in the arrangement shown and mounted on one of the rods J² is a retainer or holdback, consisting of two flat bars J⁴, one arranged over the other and each having its outer or free end $j^4$ downwardly curved, as shown in Figs. 1, 8, 12, and 16. This retainer or holdback is located and arranged for its curved end to lie in the path of travel of the butt-ends of the pickets, so as to engage the free butt-end on the advanced side of a bow picket and hold such end back and prevent the end from springing out and interfering with the operation of the twisting mechanism for the strand or longitudinal tie-wires.

A twisting device is provided for each strand or longitudinal tie-wire, and this twisting device consists of a head K in the form of two plates, each plate having its lower end K' pointed in the construction shown, and extending up in the lower end of each plate is a slot $k$, which slot extends through an annular rim or bearing $k'$ on the outer face of each plate. The two plates are secured together and held apart at the lower end by bolts or screws $k^2$ and a sleeve $k^3$ around each bolt or screw, as shown in Figs. 10 and 11. Some of the heads of the twisting device have attached thereto by a bolt or otherwise a plate K², the lower end of which is rearwardly curved and extends below the point of the head, as shown in Figs. 11 and 26, for the curved ends to act as a retainer or holdback against the side bar or wire of the pickets. The several heads are attached to a common supporting-bar K³ by bolts $k^5$ or otherwise, so that with the rise and fall of the bar K³ all of the heads will be raised and lowered simultaneously. The point K' of each twisting-head has mounted therein between the plates a twisting-pinion L, having extending thereinto a slot $l$ to coincide with the slot $k$ in the point and having a hub $l'$ to enter the bearings or annular rims on the plates of the head, giving the pinion a mounting on the head which will allow of its turning freely. A rack-bar L', common to all of the twisting-pinions, is mounted between the plates of the several heads and extends across the full width of the machine, as shown in Fig. 2. This rack-bar L' is located below and in line with and moves with the supporting-bar K³, and the supporting-bar and the rack-bar are carried by slides L², one at each side of the machine, and supported from the side beams of the machine.

A bell-crank M is located at each side of the machine in line with the side beam, and one bell-crank is fixed to the end of a rock-shaft M' and the other bell-crank is fixed to the end of a rock-shaft M², and the rock-shafts are supported in suitable journal-boxes or bearings on the ends of standards or uprights M³ and M⁴, the upright M⁴ for the rock-shaft M² being a greater distance away from the support M³ than is the upright M⁴ for the shaft M' in the construction shown, and each upright M⁴ is divided, one having a space between the two sections in which is located and operates the slide L², which carries the supporting-bar and the rack-bar. Each bell-crank has an arm $m$ and an arm $m'$, and each arm $m'$ is connected by a link $m^2$ with the supporting-bar K³, as shown in Fig. 2. Each bell-crank is attached to its rock-shaft, as shown by a key $k^2$, and the rock-shafts are held against endwise thrust or movement in one direction by a collar $m^4$ on the rock-shaft and locked thereto by a set-screw or otherwise, and both bell-cranks are given the same oscillation by a connecting rod or bar $m^5$, pivotally attached at its ends to the arms $m$ of the bell-cranks. A coil-spring M⁵ is attached at one end to the connecting-bar $m^5$ and at its other end to the upright M³ of the rock-shaft M' and furnishes the means for returning the supporting-bar and the rack-bar to their dropped or lower position for the rack-bar to operate the twisting-pinions and twist together the strand or longitudinal tie-wires.

The rock-shaft M² has mounted thereon and fixed thereto by a set-screw or otherwise a collar M⁶, projecting out from which is an arm $m^6$, depending from which are links or plates $m^7$, and, as shown, the pivot or connecting pin $m^8$ for the upper end of the links or plates $m^7$ passes through a slot $m^9$, permitting the necessary amount of lost motion or slide for rocking the shaft M² properly to move the arms of the bell-cranks M for raising and lowering the supporting-bar and the rack-bar. A shoe N is attached near one end of a bar N', the end of which adjacent to the shoe is connected between the plates or links $m^7$ by a pin or pivot $n$ and the other end of which is pivotally attached to a standard or upright $n'$, and, as shown, to hold the shoe in alinement a guide bar or standard $n^2$ extends up adjacent to the outer face of the bar N', which carries the shoe. The shoe N is located adjacent to one side of the vertical center of the underrunning face of a gear-wheel N³, which wheel carries a semicircular rim N², having a projecting track or flange $n^2$, which as the wheel turns comes in contact with the face of the shoe N and holds the shoe in its lowermost depressed position, in which position the plates or links $m^7$ will be held down, depressing the arm $m^6$ and rocking the shaft M² for the rock of the shaft M², through the arms $m$ and the connecting-bar $m^5$, to rock the shaft M', raising the arm $m'$ of both bell-cranks and through the links $m^2$ raising the supporting-bar K³ and the rack-bar L' for the twisting mechanism to be above and clear of the strand or longitudinal tie-wires. The rotation of the gear-wheel $N^3$ carries around with it the guide or track $N^2$, and when the tail end of the track passes the end of the shoe the spring $M^5$ acts and turns the rock-shafts M' and $M^2$, carrying down or depressing the arms $m'$ and through the links $m^2$ lowering or depressing the supporting-bar and the rack for the twisting mechanism to engage with the strand or longitudinal tie-wires for the twisting operation, and the shoe is carried inwardly by this movement into the position shown in Fig. 28, allowing the twisting mechanism to remain in its operative position until a roller $n^3$ on the gear-wheel $N^3$ strikes and engages the face of the shoe N, as shown in Fig. 29, forcing the shoe downward and outward for its face to be engaged by the guide or track $N^2$, raising the supporting-bar and the rack-bar, as already described. The supporting-bar and the rack-bar are automatically raised through the rotation of the gear-wheel $N^3$ and are held in their raised position while the guide or track $N^2$ is engaged with the shoe, and with the passage of the guide or track from the shoe the spring $M^5$ is free to act and automatically depress or lower the supporting-bar and the rack-bar, thus giving the rising and falling movement of the twisting mechanism an automatic control by which the mechanism will be out of use while the pickets and the strand or longitudinal tie-wires are fed forward and will drop into position for use at the terminus of the forward feed of the pickets and the strand or longitudinal tie-wires, and the dropping of the twisting mechanism into position for use will occur when the space between the bow pickets is midway in vertical alinement with the heads of the twisting mechanism, as shown in Fig. 4 by the dotted lines. The gear-wheel $N^3$ is mounted on a shaft $N^4$ and is fixedly attached to the shaft by a key $n^4$ or otherwise, and on this shaft is a bevel gear or pinion $N^5$, likewise locked to the shaft by a key $n^4$ or otherwise, which bevel gear or pinion is in mesh with a bevel gear or pinion $N^6$ on the end of the shaft D, driving the shaft D from the rotation of the bevel-gears through the rotation of the shaft $N^4$.

A gear O is mounted on the shaft $N^4$ and is locked thereto by a key $o$ or otherwise, and this gear is in mesh with a gear O', so that the two gears will have opposite rotation. The gear O has fixed thereto an arm $O^2$, having at its outer end a roller $o$, mounted on a stud or journal-pin $o'$, and the gear O' has fixed thereto an arm $O^3$, having at its end a roller $o^2$, mounted on a stud or journal-pin $o^3$, one arm revolving with its gear in the opposite direction to the other arm, as shown in Fig. 27. The gear O' is mounted on a shaft $O^4$ and is locked to the shaft by a key $o^4$ or otherwise, and on the shaft $O^4$ is mounted a gear $O^5$, likewise locked to the shaft by a key $o^4$ or otherwise, and on the shaft $O^4$ is a gear-pinion $O^6$, which meshes with the gear $N^3$ and drives such gear. The shaft $N^4$ is mounted in suitable journal-boxes or bearings $n^5$ on the side rails or beams $A^6$ of a frame extending laterally from the main frame, and the shaft $O^4$ is mounted in suitable bearings or journal-boxes $o^5$ on the side rails or beams $A^6$, as shown in Fig. 24. The side rails $A^6$ are supported by legs $A^7$ and at their inner ends in the construction shown are bolted or otherwise secured to the inner beam or rail of the main frame.

A reciprocating bar P is located adjacent to the gears O and O', and a bar P' is attached at one end to the reciprocating bar P, and its other end is connected to the rack-bar L', so that with the reciprocating movement of the bar P the rack-bar will be given a corresponding movement. The reciprocating bar has mounted thereon a head or pendant $P^2$ to coact with the arm $O^2$ and a head or pendant $P^3$ to coact with the arm $O^3$, and, as shown, each head or pendant has a socket or slide $p$ to receive the bar P and is locked to the sliding bar P when properly adjusted by set-screws $p'$ or otherwise. The head or pendant $P^2$ has a straight wall or face $p^2$, which is contacted by the roller $o$ with the revolving of the gear O and moves the rack-bar in the direction of travel of the arm $O^2$ and its gear, and the head or pendant $P^3$ has a straight wall or face $p^3$, which is contacted by the roller $o^2$ of the arm $O^3$ as the arm revolves with its gear O' for the contact to move the sliding bar in the direction of rotation or travel of the arm $O^3$ and its gear. It will thus be seen that the rack-bar is moved in one direction by the head or pendant $P^2$ through the engagement therewith of the arm $O^2$ and is moved in the opposite direction by the head or pendant $P^3$ through the engagement therewith of the arm $O^3$, thus giving the sliding bar P a reciprocating movement coincident with and derived from the rotation of the gears carrying the arms $O^2$ and $O^3$, thus insuring a positive movement of the sliding bar. The contact of the arms $O^3$ with the head or pendant $P^3$ moves the sliding bar outward, or in the direction for the forward throw of the rack-bar to operate the twisting mechanism, and this movement occurs after the twisting mechanism has been dropped by the shoe N leaving the guide or track $N^2$, giving the twisting mechanism the requisite movement through the rotation of the twisting-pinions by the forward or outward movement of the rack-bar to twist together the strand or longitudinal tie-wires. The outward travel of the sliding bar P, with the bar P' connected thereto, continues to the limit of the contact of the roller $o^2$ with the wall or face $p^3$, and before the limit of outward travel is reached a wall or face $p^4$ on the head or pendant $p^3$ strikes a pin or projection $o^7$ on a trip-arm O', pivotally mounted on the support P⁶ of the sliding bar, raising the finger $o^6$ of the trip-arm into the position shown in Fig. 27 by dotted lines for the finger to be engaged by the roller $o^2$, forcing the trip-arm to its normal position for the pin $o^7$ to carry inwardly or backwardly for a short distance the sliding bar P and with it the rack-bar, giving a backlash or movement to the twisting-pinions to bring the slots of such pinions in line with the slots in the points of the head, allowing the twisted strand or longitudinal tie-wires to pass through the slots as the twisting mechanism is elevated or raised, clearing the twisting mechanism from the fence. The backlash or movement of the twisting-pinion occurs just before the roller $n^3$ reaches the shoe N, and with the passage of the roller $n^3$ onto the face of the shoe, depressing the shoe and rocking the shafts M' and M² to raise the twisting mechanism clear of the fence, the arm O² has been carried around for its roller $o$ to engage the wall or face $p^2$ of the head or pendant $p^3$ and carry inwardly or backwardly the sliding bar P and with it the connecting-bar P' and the rack-bar, with the supporting-bar K³ and the rack-bar in their raised position for the twisting mechanism to be non-acting, and the necessary lost motion or space for the rising-and-falling movement of the supporting-bar and the rack-bar is obtained, in the arrangement shown, by connecting the tie-bar P' with the rack-bar L' by an upwardly-turned end $p^5$ of the tie-bar, having therein a slot $p^6$, through which the bolt $p^7$ for attaching the rack-bar L' to the tie-bar P' passes, as shown in Figs. 26 and 27. A connecting-bar P⁴ is located forward of the twisting mechanism and is supported by standards or uprights P⁵, extending up from each side beam A of the main frame, and this connecting-bar extends the length of the lateral frame carrying the driving-gear and is attached at its end between guide-bars P⁶, extending up from a standard or post P⁷, and, as shown, the sliding bar P runs between rollers $p^8$, mounted on pins $p^9$ in the upright P⁵ of the inner beam of the main frame and between the plates P⁶, and the rack-bar L' runs on its upper edge against rollers $l^2$, mounted on journal-pins $l^3$ between the plates of each head K, as shown in Figs. 8 and 10, thus giving an easy movement in reciprocating the sliding bar P and the rack-bar L', connected therewith.

A driving-pulley Q is loosely mounted on a shaft Q' by a hub or sleeve $q$, and the shaft Q' is supported in a journal bearing or box $q'$ on the side beam or rail of the lateral frame, as shown in Fig. 24, and at its end is a pinion Q², locked to the shaft by a key $q^2$ or otherwise and in engagement with the gear O⁵, and, as shown, the shaft Q' is held against end thrust in one direction by a collar $q^3$, which abuts against the bearing or journal-box $q'$, as shown in Fig. 24. The other end of the shaft Q' is mounted in a journal-box $q^4$ on a standard or post Q⁴, and this end of the shaft has fixed thereto a section $q^5$ of a clutch, the other section, $q^6$, of which is on the driving-pulley, and a suitable belt Q³ runs over the driving-pulley, which belt is to be driven from any suitable source of power for driving the shaft Q' and driving the train of gear for operating the shoe N and the arms O² and O³ to raise the supporting-bar K³ and the rack-bar and to reciprocate the sliding bar P and the rack-bar in the operation of the twisting mechanism. The hub or sleeve $q$ of the belt-pulley is connected with a fork $q^7$ of an oscillating arm or lever Q⁵, pivotally supported from the lateral frame of the machine and engaged at its lower end by a crank of a rod or shaft Q⁶, mounted in supports Q⁷ so as to be free to rock and by the turning of the crank end oscillate the arm or lever Q⁵ to engage and disengage the clutch of the belt-pulley. The rock-shaft or rod Q⁶ has fixed to its end an arm $q^8$, connected by a link $q^9$ with an arm $q^{10}$, fixed to a rod or shaft $q^{11}$, mounted in a bearing or journal-box $q^{12}$ and having fixed to its end a V-shaped treadle by which the rock-shaft can be turned to the right or left, as required, for engaging and disengaging the clutch of the belt-pulley. The engagement of the clutch drives the shaft Q' for the pinion Q² to drive the gear O⁵ and turn the shaft O⁴, revolving the gear O', which meshes with the gear O, and the revolving of the shaft O⁴ revolves the pinion O⁶, which meshes with the gear N³, so that the shaft N⁴ is driven from both the gear O and the gear N³, thereby causing the bevel gear or pinion N⁵ to drive the bevel gear or pinion N⁶ and revolve the shaft D to operate the cam E and raise and lower the arm F to advance the feed-chains H², which carry the pickets. It will thus be seen that the entire operative mechanism of the machine as a whole is driven from the belt-pulley Q, and with the clutch of the belt-pulley disengaged the entire mechanism will be stopped.

The shaft C has fixed to one of its ends by a key $r$ or otherwise a sprocket-wheel R, and a companion sprocket-wheel R' is attached by a key $r'$ or otherwise to a shaft S, and over the sprocket-wheels R and R' a sprocket-chain R² runs, and, as shown, a belt-tightener $r^2$ on a pivoted plate or arm $r^3$ is arranged to keep the sprocket-chain properly taut. The shaft S has fixed to its end by a key $s$ or otherwise a disk S', having a smooth periphery, and on opposite sides of the disk to coact with the smooth periphery are brake-shoes S², each having an acting face or strip of suitable material $s'$, that will frictionally bear against the periphery of the disk. Adjacent to the inner face of the disk S' is a head or arm S³, extending both sides of the shaft, and each shoe S² has on its outer face ears $s^2$, to which is pivoted one end of a connecting-link S⁴, the body of which passes between ears $s^3$ on the head or arm S³ and is pivotally connected with the ears, and the other end of the link is pivotally connected between ears $s^4$ of a turnbuckle S⁵, the other end of which receives between its ears $s^5$ an ear $s^6$ on a loose collar S⁶, mounted on a sleeve S⁷, to which is attached, by a key $s^7$ or otherwise, the head or arm S³, and the sleeve is loosely mounted on the shaft S and is free to turn independent of the shaft and has the sprocket-wheel R' attached thereto by the key $r'$ or otherwise. The collar S⁷ is held against end movement toward the head or arm S³ by a jam-nut $s^8$, threaded onto the sleeve, thus adjusting, in connection with the turnbuckle, the links $s^4$ so as to properly coact and set the brake-shoes onto the disk and regulate the amount of rotation of the shaft S in winding the completed fence onto a reel as the roll increases in diameter. The shaft is mounted in a suitable journal-box $s^9$ on a standard or upright S⁸, and the end of the shaft which projects beyond the journal-boxes has attached thereto, by a key $s^{10}$ or otherwise, one section, S⁹, of a clamp-holder for a reel-frame, the other section, S¹⁰, of which is attached to the reel-bars S¹¹ and has a center or hub $s^{11}$, which is entered into the section S⁹ of the clamp or holder and secured therein by a pin or bolt $s^{12}$, as shown in Fig. 18. This arrangement for driving the reel to wind up the completed fence into a roll enables the necessary compensation of rotation as the roll increases in diameter, so as not to strain the fence or the mechanism, as when the amount of fence completed at each advance of the carrying-chains for the pickets is wound onto the reel the resistance is sufficient to allow the sprocket-wheel R' and the sleeve S⁷ to turn independently of the disk S', as the brake-shoes S² will slip on the periphery of the disk without turning the disk, and as the turning of the disk turns the shaft S it will be seen that the shaft S stops when the strain of the completed fence overcomes the friction of the shoes, thus allowing the sprocket-wheel R' and the sleeve to turn without affecting the reeling operation.

A registering appliance is arranged to indicate the number of feet completed at any time in the operation of the machine. The registering mechanism consists of an annular plate or disk T, having teeth $t$ on its periphery and a series of consecutive numbers on its face, a number being provided for each tooth. The tooth plate or disk is mounted on a journal pin or pivot $t'$, projecting out from a standard or upright T', attached to the upper flange of a side beam of the main frame, and suspended from the journal pin or pivot $t'$ is a swinging arm T², carrying a dog or pawl $t^2$, which engages with the teeth $t$ of the ratchet plate or disk. The swinging arm T² is contacted by rollers T³, mounted on journal pins or pivots $t^3$, extending out from the face of the sprocket-wheel R and arranged at a predetermined distance apart—as, for instance, to indicate a foot of completed fence—as each roller strikes and moves the swinging arm for the movement of the arm to advance the ratchet plate or disk one notch, thereby indicating by the numerals on the face of the ratchet plate or disk consecutively the number of feet of completed fence. The dog or pawl $t^2$ is held in engagement with the ratchet plate or disk T in the arrangement shown by an arm T⁴, pivotally mounted on an upright $t^4$ for its end to bear against the ratchet or pawl $t^2$ and having at its other end a rod or cord T⁵, from which is suspended a weight $t^5$, which serves to hold the pawl or ratchet end of the arm T⁴ against the ratchet or pawl and at the same time allow of the downward throw of the ratchet or pawl to pass a tooth. The ratchet plate or disk is held against back rotation by a spring-catch $t^6$ on the standard or upright T', and, as shown, a pointer $t^7$ extends over the edge of the ratchet plate or disk from the standard or upright T' and indicates the number of each advance of the ratchet plate or disk. A spring $t^8$, attached at one end to the swinging arm T² and at the other end to a side beam of the main frame or otherwise, serves to return the swinging arm to normal position after a roller T³ has acted and advanced the swinging arm, and the limit of return movement is stopped by the engagement of the swinging arm with a stop $t^9$, attached to the side beam of the main frame, with its end projecting in the line of throw of the swinging arm, as shown in Fig. 4. The shaft C by its intermittent rotation through the cam E and arm F intermittently revolves the sprocket-wheel R and as the sprocket-wheel turns the rollers T³ thereon successively strike and advance the swinging arm T², causing the pawl $t^2$ to advance the ratchet plate or disk one tooth at each advance, bringing the numbers on the face of the wheel consecutively in line with the pointer, thus indicating the number of feet of completed fence.

A stripping and carrying roller U has its shaft $u$ mounted in suitable journal boxes or bearings $u'$ in brackets or pendants U', attached to the under side of each side beam of the main frame, and this stripping-roller is located and arranged so that as the completed wire passes thereunder from the carrying-wheels H⁴ the roller will act and withdraw the strand or longitudinal tie-wires from the notches $h^{11}$ of the carrying-wheels. The carrying-wheels are fixedly mounted on the shaft C for a carrying-wheel to be in line with a trough or guideway H³ for the carrying-chains. Each carrying-wheel H⁴ has a center or hub for the attachment of the wheel to the shaft and a series of radial arms or spokes $h^9$, each arm or spoke terminating in a head $h^{10}$, having therein a slot $h^{11}$, adapted to engage with the strand or longitudinal tie-wire back of the juncture of the straight and bow pickets, as shown in Figs. 8, 9, 12, and 13. The forward side of each arm or spoke below the notch $h^{11}$ has a rest or shoulder formed of a straight face $h^{12}$ and an inclined face $h^{13}$, on which rest or shoulder the pickets ride as the carrying-wheel turns and carries the strand or longitudinal tie-wires out from the twisting-slot of each twisting head and pinion, as shown in Figs. 12 and 13. The strand or longitudinal tie-wires for each carrying-wheel are engaged by an arm or spoke of the wheel in the notch $h^{11}$ between the terminal of the chain trough or guideway and the twisting-head, as shown in Fig. 8, and the forward rotation of the carrying-wheel, with the twisting mechanism in its elevated position, carries with it the fence, bringing into position the space between the sides of the bow pickets at which the next twisting operation is to be performed, and with the bringing of the strand-wires and the pickets into position for the next twisting operation the rotation of the shaft C stops and with it the rotation of the carrying-wheels $H^4$, leaving the fence stationary and in position for the descent of the twisting mechanism to perform the twisting operation on the strand or longitudinal tie-wires. This intermittent advance of the fence is one which brings the space between the sides of the successive bow pickets into position at each advance for the twisting mechanism to operate on the strand or longitudinal tie-wires, and the carrying-wheels continue engaged with the strand or longitudinal tie-wires back of the pickets until each arm or spoke successively reaches a point of downward inclination where the passage of the fence under the stripping-roller V will withdraw the strand-wires from the retaining-notches and the pickets from the rest or shoulder of the carrying-wheels, leaving the arms or spokes clear to successively receive the strand or longitudinal tie-wires and the pickets as they come into position for the purpose. A roll $U^2$ has its shaft $u^2$ mounted in suitable bearings $u^3$ in a depending bracket $U^3$, bolted to the under or lower flange of each side beam, and, as shown, these brackets $U^3$ at their lower end have mounted therein the rock-shaft $Q^6$ for operating the clutch of the driving-pulley Q. The roll $U^2$ is located and arranged under the machine for the carrying-chains $H^2$ to pass thereunder and serves to keep the chains taut and in proper running condition, and, as shown in Fig. 1, the driving-chain $G^2$ passes over the upper traveling face of the roll, holding the chain against too great sag. A sleeve-roller $U^4$, mounted on a shaft $u^4$, supported in bearings $u^5$ on a plate $U^5$, bolted to the front legs $A'$, furnishes a traveling surface under which the lower strand or longitudinal tie-wires pass from the spools or rolls.

A pair of end pieces or standards V, each having a foot or flange $v$, are bolted to the cross-bar $A^2$, and each standard has a lateral extension $v'$ with a curved under face to which is secured a backing $V'$, forming the body of a receptacle for the straight pickets. Extending from end piece or standard to end piece or standard is a support $V^2$, having attached thereto a series of guide-fingers $v^2$, which coact with a series of receiving guide-fingers $v^3$, bolted or otherwise fastened to the cross-piece $A^2$, so that the ends of two companion fingers $v^2$ and $v^3$ pass each other with a sufficient space between them for the passage of the straight pickets one by one to enter the slot between the plates $h^7$ and $h^8$ and lie in front of the stop or stud $h^2$ of the carrying-chains. The straight pickets are separated from the bunch in the receptacle therefor and carried around one by one to be deposited on the carrying-chains by a roller $V^3$, having around its periphery a series of plates $V^4$, with a space $v^4$ between the plates of sufficient width to receive a single straight picket therein to have the straight picket caught in a space to drop therefrom as the roller turns and reaches a point where the picket will pass down the upper guide-finger $v^2$ onto the lower guide-finger $v^3$ to fall onto the carrying-chains in position to be advanced. The roller is fixedly mounted on a shaft $V^5$, held against endwise thrust by collars $v^5$, which abut against standards $V^6$, in which the ends of the shaft have their bearings, and each standard has a foot or flange $v^6$, by means of which the standards are secured one to a plate $V^7$, bolted to the side beam of the main frame, and the other to an angle-piece $A^4$, extending from the cross-piece $A^2$ to the cross-piece $A^3$ in the arrangement shown. The shaft B has fixed thereon a sprocket-wheel $B'$, and the shaft $V^5$ has fixed thereon a sprocket-wheel $B^2$, over which sprocket-wheels $B'$ and $B^2$ a sprocket or driving chain $B^3$ runs for giving an intermittent rotation to the shaft $V^5$, coincident with the intermittent rotation of the shaft B for turning the roller $V^3$ to discharge the straight pickets.

W is a guide-wheel for the upper strand or longitudinal tie-wire, which wheel, as shown, is pivotally mounted in a bracket $w$, attached to a suitable upper support, and a guide-wheel W is provided for each strand or longitudinal tie-wire. A tension-clamp $W'$ is located in advance of the guide-wheel W and is carried by a bracket $w'$, attached to an upper support, and this clamp device $W'$ is of any suitable construction for giving the requisite tension on the strand or longitudinal tie-wires. A tension device $W^2$ is attached to the floor or other support for the machine, at the receiving end thereof, which tension device can be of any suitable construction for giving the requisite tension on the lower strand or longitudinal tie-wires. The bow pickets X, as shown, are formed of two wires twisted together to have a bow end $x$ and two side bars each having a straight portion $x'$, an inward and outward turned portion $x^2$ $x^3$, coming together at $x^4$, and an inwardly-turned portion $x^5$, continuing from the outwardly-turned portion $x^3$, as shown in Figs. 20 and 21. The straight pickets Y, as shown, are formed of two wires twisted together, and the bow pickets are longer than the straight pickets in the construction shown. The upper strand or longitudinal tie-wires Z run from spools (not shown) over the wheels W and through the tension device W', and the lower strand or longitudinal tie-wires Z' run from spools (not shown) through the tension device $W^2$, the companion upper and lower strand or longitudinal tie-wires running in the same vertical plane. The lower strand or longitudinal tie-wires pass through and are guided by the lower guides I, and the upper strand or longitudinal tie-wires pass through and are guided by the upper guide J, with the bow and straight pickets between the two wires in their passage through the guides.

The several mechanisms are driven in the arrangement shown from the drive-pulley Q and the drive-shaft Q' through the train of gear actuated from such shaft. The drive-shaft D continuously revolves, carrying with it the cam E, which operates to raise the cam F and intermittently rotate the shaft C, and the shaft C through the sprocket or drive chain $G^2$ intermittently rotates the shaft B, giving the carrying-chains $H^3$ an intermittent advance and also giving the carrying-wheels $H^4$ an intermittent advance. The shaft B through the drive-chain $B^3$ gives the roller $V^5$ an intermittent rotation coincident with the advance of the carrying-chains. The gear-wheel $N^3$, in connection with the track $N^2$, actuates the shoe N to operate the shaft $M^2$, oscillating the bell-crank on such shaft and through the connecting-bar $m^5$ oscillating the bell-crank M on the shaft M' for the upward throw of the bell-cranks to raise the twisting mechanism and the downward throw or movement of the bell-cranks through the action of the spring $M^5$ to lower the twisting mechanism, and the movements of the twisting mechanism in rising and falling are so timed in connection with the movements of the carrying-chains and the carrying-wheels as to have the twisting mechanism descend as the chains cease each advance movement and come to a state of rest and to have the twisting mechanism rise while the carrying-chains are at rest, withdrawing the twisting mechanism from the strand or longitudinal tie-wires, after which the carrying-chains are again advanced. The parts are so timed as to have the arm $O^3$ engage the head or pendant $P^3$ and move the rack-bar L' outward, operating the twisting-pinions and twisting the strand or longitudinal tie-wires in the space between the pickets, during which operation the carrying-chains are at rest, and with the slight return or backlash of the rack-bar by the action of the arm or finger $O^4$ the twisting mechanism is returned to position to be raised clear of the strand or longitudinal tie-wires, at which time the roller $n^3$ engages the shoe N and rocks the bell-cranks M to raise the twisting mechanism, and the arm $O^2$ is brought into engagement with the head or pendant $P^2$ to return the rack-bar L' to normal position, and during such return the carrying-chains are advanced, moving the strand or longitudinal tie-wires and the pickets forward into position for the next operation of the twisting mechanism. It will thus be seen that the various mechanisms are timed in coöperative relation one with the other for the carrying mechanism to be at rest when the twisting mechanism is in operation and the twisting mechanism to be at rest when the carrying mechanism is in operation.

The operation will be understood from the foregoing description, but briefly is as follows: The strand or longitudinal tie-wires are threaded into the machine. The straight pickets are deposited on the strand or longitudinal tie-wires, resting above the underwires, and the bow pickets are placed in position by hand, the pickets being grasped as shown in Fig. 20 and laid in position above the under strand-wire and in relation to each other and to the straight pickets as shown in Fig. 21, and when in position the bow end of the bow pickets is adjacent to or in contact with the plate $A^4$, with its end beneath the guide-piece $A^5$, which holds the bow ends of the bow pickets in place. The strand or longitudinal tie-wires and the pickets are advanced step by step by the carrying or feed chains $H^3$, passing between the guides I J and advanced by the carrying-wheels $H^4$ into position for the space between the pickets to be below the twisting mechanism and have the twisting mechanism as it descends receive into the slots the strand or longitudinal tie-wires for the wires to be twisted together, as shown in Fig. 22, each side of the pickets at the straight portions and at the inbent portions thus securing the pickets in place to be retained by the strand or longitudinal tie-wires. The forward end of the completed fence is passed onto the reel and is wound on the reel by the action of the driving-gears and chain and the disk and brake-shoe, and the number of feet produced is registered on the numbered disk T, keeping an automatic record of the produced fencing. The mechanisms for carrying the pickets and the strand or longitudinal tie-wires forward and for twisting the strand or longitudinal tie-wires operate alternately, and the operation of these mechanisms is continued until the number of feet required has been produced or reeled or until the spools of strand or longitudinal tie-wires are exhausted, and when exhausted new spools can be placed in position and the operation of producing the fence by the mechanisms proceeded with.

It will be seen that with the exception of placing the bow pickets in position the operation of the machine as a whole is entirely automatic and is controlled by the clutch of the driving-pulley.

What I regard as new, and desire to secure by Letters Patent, is—

1. In a machine for making ornamental fence, the combination of a pair of intermittently-rotatable shafts, a continuously-revolving shaft, means carried by the continuously-revolving shaft and engaging means carried by one of the intermittently-rotatable shafts for automatically giving an intermittent rotation to said shaft, and means for imparting intermittent rotation therefrom to the companion intermittently-rotatable shaft, and carrying or feed chains for the pickets of the fence having an intermittent advance given thereto from the pair of intermittently-rotatable shafts, substantially as described.

2. In a machine for making ornamental fence, the combination of a pair of intermittently-rotatable shafts, a continuously-revolving shaft, a cam on the continuously-revoluble shaft, means actuated by the cam for giving an intermittent rotation to one of the rotatable shafts and imparting rotation therefrom to the companion intermittently-rotatable shaft, and carrying or feed chains for the pickets of the fence having an intermittent advance given thereto from the intermittently-rotatable shafts, substantially as described.

3. In a machine for making ornamental fence, the combination of a pair of intermittently-rotatable shafts, a continuously-revoluble shaft, a cam on the continuously-revolving shaft, a loosely-mounted arm engaged by the cam, a pawl carried by the loosely-mounted arm, a ratchet-wheel fixed on one of the intermittently-rotatable shafts, means for imparting rotation from the rotatable shaft having the ratchet-wheel thereon to the companion intermittently-rotatable shaft, and carrying or feed chains for the pickets of the fence having an intermittent advance given thereto from the intermittently-rotatable shafts, substantially as described.

4. In a machine for making ornamental fence, the combination of a pair of intermittently-rotatable shafts, a continuously-revolving shaft, a cam on the continuously-revolving shaft, a loosely-mounted arm, a roller on the arm engaged by the cam, a pawl carried by the arm, a ratchet-wheel fixed on one of the intermittently-rotatable shafts and having the cam-arm loosely mounted on its hub, means for imparting rotation to the companion intermittently-rotatable shaft from the shaft having the ratchet-wheel thereon, and carrying or feed chains for the pickets of the fence having an intermittent advance given thereto from the intermittently-rotatable shafts, substantially as described.

5. In a machine for making ornamental fence, the combination of a pair of intermittently-rotatable shafts, a continuously-revolving shaft, a cam on the continuously-revolving shaft, a loosely-mounted arm, a roller on the arm engaged by the cam, a pawl carried by the arm, a ratchet-wheel fixed on one of the intermittently-rotatable shafts and having the cam-arm loosely mounted on its hub, a sprocket-wheel on said shaft, a sprocket-wheel on the companion intermittently-rotatable shaft, a sprocket-chain running over the sprocket-wheels for giving both shafts their intermittent rotation, and carrying or feed chains for the pickets of the fence having an intermittent advance given thereto from the intermittently-rotatable shafts, substantially as described.

6. In a machine for making ornamental fence, the combination of a pair of intermittently-rotatable shafts, a continuously-revolving shaft, a cam on the continuously-revolving shaft, a loosely-mounted arm, a roller on the arm engaged by the cam, a pawl carried by the arm, a ratchet-wheel fixed on one of the intermittently-rotatable shafts, a retaining-dog engaging the ratchet-wheel and permitting a limited back rotation of the intermittently-rotatable shafts, means for imparting rotation from the shaft having the ratchet-wheel thereon to the companion intermittently-rotatable shaft, and carrying or feed chains for the pickets of the fence having an intermittent advance given thereto from the intermittently-rotatable shafts, substantially as described.

7. In a machine for making ornamental fence, the combination of a series of twisters, one for each pair of upper and lower strand tie-wires, a series of picket-carrying chains having picket-retainers thereon and located forward and intermediate of and having their upper surfaces traveling in a horizontal plane toward the twisters, and means for giving the chains an intermittent advance, substantially as described.

8. In a machine for making ornamental fence, the combination of a series of twisters, one for each pair of upper and lower strand tie-wires, a series of picket-carrying chains located forward and intermediate of and having their upper surfaces traveling in a horizontal plane toward the twisters, one or more of said chains having the alternate links provided with stops for engaging the pickets, and means for giving the chains an intermittent advance, substantially as described.

9. In a machine for making ornamental fence, the combination of a series of twisters, one for each pair of upper and lower strand tie-wires, a series of picket-carrying chains located forward and intermediate of and having their upper surfaces traveling in a horizontal plane toward the twisters, some of said chains having receivers on the alternate links to receive and retain the pickets, and means for giving the chains an intermittent advance, substantially as described.

10. In a machine for making ornamental fence, the combination of a series of picket-carrying chains, some of said chains having stops on the alternate links, and some of said chains having receivers on the alternate links for the stops and receivers to engage and hold the pickets in position, and means for giving the chains an intermittent advance, substantially as described.

11. In a machine for making ornamental fence, the combination of a series of picket-carrying chains on which the pickets are deposited and retained, an upper guide for a strand or longitudinal tie-wire, a lower guide for a strand or longitudinal tie-wire between which guides the pickets on the carrying-chains run, and means for giving the chains an intermittent advance, substantially as described.

12. In a machine for making ornamental fence, the combination of a series of picket-carrying chains on which the pickets are deposited and retained, an upper guide for a strand or longitudinal tie-wire, a lower guide for a strand or longitudinal tie-wire between which guides the pickets on the carrying-chains run, carrying-wheels receiving the pickets and the strand or longitudinal tie-wires from the guides, and means for giving the chains an intermittent advance, substantially as described.

13. In a machine for making ornamental fence, the combination of a series of picket-carrying chains on which the pickets are deposited and retained, an upper guide for a strand or longitudinal tie-wire, a lower guide for a strand or longitudinal tie-wire between which guides the pickets on the carrying-chains run, carrying-wheels receiving the pickets and the strand or longitudinal tie-wires from the guides, pressers located and operating between the wire-guide and the carrying-wheels for directing the fence onto the carrying-wheels, and means for giving the chains an intermittent advance, substantially as described.

14. In a machine for making ornamental fence, the combination of a series of picket-carrying chains on which the pickets are deposited and retained, an upper guide for a strand or longitudinal tie-wire, a lower guide for a strand or longitudinal tie-wire between which guides the pickets on the carrying-chains run, carrying-wheels receiving the pickets and the strand or longitudinal tie-wires from the guides, and a twisting mechanism for each pair of strand or longitudinal tie-wires located and operating in correlation with the carrying-wheels, and means for giving the chains an intermittent advance, substantially as described.

15. In a machine for making ornamental fence, the combination of a series of picket-carrying chains on which the pickets are deposited and retained, an upper guide for a strand or longitudinal tie-wire, a lower guide for a strand or longitudinal tie-wire, between which guides the picket-carrying chains run, carrying-wheels receiving the pickets and the strand or longitudinal tie-wires from the guides, a twisting mechanism for each pair of strand or longitudinal tie-wires located and operating in correlation with the carrying-wheels, retainers or holdbacks engaging the pickets and preventing interference from the pickets with the operation of the twisting mechanism, and means for giving the chains an intermittent advance, substantially as described.

16. In a machine for making ornamental fence, the combination of a series of picket-carrying chains on which the pickets are deposited and retained, an upper guide for a strand or longitudinal tie-wire, a lower guide for a strand or longitudinal tie-wire, between which guides the pickets on the carrying-chains run, carrying-wheels one for each pair of strand or longitudinal tie-wires, each wheel consisting of a series of spokes or arms having a notch in the end of each spoke or arm and a rest or support on the advance side of each spoke or arm below the notch, and means for giving the chains an intermittent advance, substantially as described.

17. In a machine for making ornamental fence, the combination of a series of picket-carrying chains on which the pickets are deposited and retained, an upper guide for a strand or longitudinal tie-wire, a lower guide for a strand or longitudinal tie-wire, between which guides the pickets on the carrying-chains run, carrying-wheels carrying the pickets and the strand or longitudinal wires from the guides, a twisting mechanism located and operating in correlation with the carrying-wheels, means for giving the chains an intermittent advance, and means for raising and lowering the twisting mechanism, operating to raise the twisting mechanism with the advance of the chains and to lower the twisting mechanism with the cessation of the advance of the chains, substantially as described.

18. In a machine for making ornamental fence, the combination of a series of picket-carrying chains on which the pickets are deposited and retained, an upper guide for a strand or longitudinal tie-wire, a lower guide for a strand or longitudinal tie-wire, between which guides the pickets on the carrying-chains run, carrying-wheels carrying the pickets and the strand or longitudinal wires from the guides, a twisting mechanism located and operating in correlation with the carrying-wheels, means for giving the chains an intermittent advance, a stripping-roller located in juxtarelation to the carrying-wheels for removing the completed fence from the wheels, substantially as described.

19. In a machine for making ornamental fence, the combination of a picket-carrying mechanism, a twisting mechanism having a rising-and-falling movement, a bar carrying the twisting mechanism, a pair of bell-cranks connected with the bar, a rack-shaft for each bell-crank, an arm on one bell-crank, a main or power shaft, and means operated from the main or power shaft to automatically depress the arm and rock the bell-crank shaft to swing the bell-crank and raise the twisting mechanism at the commencement of the forward feed of the picket-carrying mechanism and to release the arm and allow the twisting mechanism to descend automatically at the cessation of the forward feed of the picket-carrying mechanism, substantially as described.

20. In a machine for making ornamental fence, the combination of a twisting mechanism having a rising-and-falling movement, a bar carrying the twisting mechanism, a pair of bell-cranks connected with the bar, a rock-shaft for each bell-crank, an arm on one bell-crank, a shoe, a bar having a rising-and-falling movement and carrying the shoe, a connection between the bar and the arm of the rock-shaft, and a revoluble track engaging the shoe for actuating the arm to rock the shafts and cause the bell-cranks to raise the twisting mechanism, substantially as described.

21. In a machine for making ornamental fence, the combination of a twisting mechanism having a rising-and-falling movement, a bar carrying the twisting mechanism, a pair of bell-cranks connected with the bar, a rock-shaft for each bell-crank, an arm on one bell-crank, a shoe, a bar having a rising-and falling movement and carrying the shoe, a connection between the bar and the arm of the rock-shaft, a revoluble wheel, a track carried by the wheel and engaging the shoe for rocking the bell-cranks to raise the twisting mechanism, substantially as described.

22. In a machine for making ornamental fence, the combination of a twisting mechanism having a rising-and-falling movement, a bar carrying the twisting mechanism, a pair of bell-cranks connected with the bar, a rock-shaft for each bell-crank, an arm on one bell-crank, a shoe, a bar having a rising-and-falling movement and carrying the shoe, a connection between the bar and the arm of the rock-shaft, a revoluble wheel, a track carried by the wheel and engaging the shoe, and a roller at the advance end of the track carrying the wheel for the roller to actuate the shoe initially and rock the bell-cranks to raise the twisting mechanism and for the track to hold the shoe and maintain the twisting mechanism in its raised position, substantially as described.

23. In a machine for making ornamental fence, the combination of mechanism for intermittently advancing the pickets and the strand or longitudinal tie-wires of the fence in the direction of a twisting mechanism, a twisting mechanism comprising a series of heads, each head having therein a twisting-pinion, both the head and pinion having slots which coincide when the parts are at rest, a supporting-bar for the head, a rack-bar engaging the twisting-pinions and carried by the supporting-bar for the heads, guides for the supporting-bar and the rack-bar and in which the two bars are free to rise and fall, a main or power shaft, and means operated from the main or power shaft to automatically raise the supporting-bar and the rack-bar into an elevated position and to automatically drop said bars, for the raising of the bars to carry the twisting mechanism out of use and the dropping of the bars to carry the twisting mechanism into position for use, the raising of the bars occurring at the commencement of the forward feed of the picket-carrying mechanism and the descent of the bars occurring at the cessation of the forward feed of the picket-carrying mechanism, substantially as described.

24. In a machine for making ornamental fence, the combination of mechanism for advancing intermittently the pickets and the strand or longitudinal tie-wires of the fence, a twisting mechanism comprising a series of heads each head having therein a twisting-pinion both the head and pinion having slots, a supporting-bar for the heads, a rack-bar engaging the twisting-pinions, guides for the supporting-bar and the rack-bar and in which the two bars are free to rise and fall, means for raising the bars into an elevated position for the twisting mechanism to be out of use, and a spring for returning the twisting mechanism into position for use, substantially as described.

25. In a machine for making ornamental fence, the combination of a picket-carrying mechanism, a twisting mechanism for strand or longitudinal tie-wires, consisting of a series of heads, a twisting-pinion for each head, the head and pinion each having a slot for the admission of the strand or longitudinal tie-wires, a supporting-bar for the heads, a rack-bar in engagement with the twisting-pinions and carried by the supporting-bar, a reciprocating bar, a bar connecting the reciprocating bar with the rack-bar, a main or power shaft, and means operated from the main or power shaft for automatically moving the reciprocating bar in both directions and have the movement in one direction operate the twisting mechanism when the picket-carrying mechanism is at rest and the movement in the opposite direction to take place when the twisting mechanism is out of use and the picket-carrying mechanism is operating, substantially as described.

26. In a machine for making ornamental fence, the combination of a twisting mechanism for the strand or longitudinal tie-wires consisting of a series of heads, a twisting-pinion for each head, the head and pinion each having a slot for the admission of the strand or longitudinal tie-wires, a supporting-bar for the heads, a rack-bar in engagement with the twisting-pinions, a reciprocating bar, a bar connecting the reciprocating bar with the rack-bar, heads or pendants on the reciprocating bar, a contact-arm for each head or pendant, and gears carrying the contact-arms for the engagement of one contact-arm with its head or pendant to move the reciprocating bar outwardly and for the contact of the other arm with its pendant or head to move the reciprocating bar inwardly giving the rack-bar a reciprocating travel, substantially as described.

27. In a machine for making ornamental fence, the combination of a twisting mechanism for the strand or longitudinal tie-wires consisting of a series of heads, a twisting-pinion for each head, the head and pinion each having a slot for the admission of the strand or longitudinal tie-wires, a supporting-bar for the heads, a rack-bar in engagement with the twisting-pinions, a reciprocating bar, a bar connecting the reciprocating bar with the rack-bar, heads or pendants on the reciprocating bar, a contact-arm for each head or pendant, gears carrying the contact-arms for the engagement of one contact-arm with its head or pendant to move the reciprocating bar outwardly and for the contact of the other arm with its pendant or head to move the reciprocating bar inwardly giving the rack-bar a reciprocating travel, and a finger engaged by the head or pendant giving the outward movement to the reciprocating bar and to the contact-arm of said head or pendant for giving the reciprocating bar a slight return movement to open the slots for the strand or longitudinal tie-wires and allow the twisting mechanism to be raised, substantially as described.

28. In a machine for making ornamental fence, the combination of intermittently-actuated means carrying the pickets and advancing the strand or longitudinal tie-wires, a twisting mechanism having rising and falling movements given thereto, a main or power shaft, means operated from the main or power shaft to automatically raise and lower the twisting mechanism, and means operated from the main or power shaft to automatically actuate the twisting mechanism for the twisting mechanism to operate on the strand or longitudinal tie-wires, the raising of the twisting mechanism carrying the same out of use and occurring at the commencement of the forward feed of the picket-carrying mechanism and the lowering of the twisting mechanism carrying the same into position for use and occurring at the cessation of the forward feed of the picket-carrying mechanism, substantially as described.

29. In a machine for making ornamental fence, the combination of mechanism intermittently operated for advancing the pickets and the strand or longitudinal tie-wires, a twisting mechanism operative with the cessation of the advance of the carrying mechanism for the pickets and wires to twist together the strand or longitudinal tie-wires between the pickets and non-operative with the advance of the carrying mechanism for the pickets and strand or longitudinal tie-wires, a main or power shaft, means operated from the main or power shaft to automatically actuate the picket-carrying mechanism, and means operated from the main or power shaft to automatically operate the twisting mechanism and have the operations of the two mechanisms alternate one with the other, substantially as described.

30. In a machine for making ornamental fence, the combination of a series of twisters, one for each pair of upper and lower longitudinal tie-wires, a series of picket-carrying chains located forward and intermediate of and having their upper surfaces traveling in a horizontal plane toward the twisters, one or more of said chains having thereon at regular intervals stops for engaging the pickets, a continuously-revolving shaft, and means actuated from the continuously-revolving shaft for giving the chains an intermittent advance in the direction of the twisters, substantially as described.

31. In a machine for making ornamental fence, the combination of a series of twisters, one for each pair of upper and lower longitudinal tie-wires, a series of picket-carrying chains located forward and intermediate of and having their upper surfaces traveling in a horizontal plane toward the twisters, one or more of said chains having thereon at regular intervals stops for engaging the pickets, a continuously-revolving shaft, means actuated from the continuously-revolving shaft for giving the chains an intermittent advance in the direction of the twisters, and means for automatically depositing on the chains the straight pickets to be engaged and carried forward by the stops on the chains, substantially as described.

32. In a machine for making ornamental fence, the combination of a series of picket-carrying chains, means for giving the chains an intermittent advance, a receptacle for the straight pickets, a recessed roller in the bottom of the receptacle, each recess adapted to receive a single picket, and means for intermittently revolving the roller to successively deposit the pickets on the chains, substantially as described.

33. In a machine for making ornamental fence, the combination of a series of picket-carrying chains, means for giving the chains an intermittent advance, a receptacle for the straight pickets, a recessed roller in the bottom of the receptacle, each recess adapted to receive a single picket, an upper guide and a lower guide having their ends passing each other and between which guides the straight pickets from the roller descend onto the carrying-chains, and means for giving the roller an intermittent rotation coincident with the intermittent advance of the carrying-chains, substantially as described.

34. In a machine for making ornamental fence, the combination of mechanism intermittently operated for advancing the pickets and the strand or longitudinal tie-wires, a twisting mechanism operative with the cessation of the advance of the carrying mechanism for the pickets and wires to twist together the strand or longitudinal tie-wires between the pickets and non-operative with the advance of the carrying mechanism for the pickets and strand or longitudinal tie-wires, and a reel for the completed fence automatically controlled as to the winding thereon of the fence, substantially as described.

35. In a machine for making ornamental fence, the combination of mechanism intermittently operated for advancing the pickets and the strand or longitudinal tie-wires, a twisting mechanism operative with the cessation of the advance of the carrying mechanism for the pickets and wires to twist together the strand or longitudinal tie-wires between the pickets and non-operative with the advance of the carrying mechanism for the pickets and strand or longitudinal tie-wires, and frictional guide-retainers for the upper and lower strand or longitudinal tie-wires, substantially as described.

JOHN E. FREDRICK.

Witnesses:
EDWARD FOX,
CARL E. SHOCK.